(12) United States Patent
Gaspard-Boulinc et al.

(10) Patent No.: US 10,551,205 B2
(45) Date of Patent: Feb. 4, 2020

(54) ACTIVITY BASED RESOURCE MANAGEMENT SYSTEM

(71) Applicant: ECOLE NATIONALE DE L'AVIATION CIVILE, Toulouse (FR)

(72) Inventors: Hélène Gaspard-Boulinc, Toulouse (FR); Stéphane Conversy, Toulouse (FR); Jean-Luc Vinot, Toulouse (FR); Mickaël Loubriat, Toulouse (FR); Alexandre Duchevet, Toulouse (FR); Clément Dupont, Toulouse (FR); Matthieu Riedinger, Toulouse (FR); Matthieu Pujos, Toulouse (FR); Raïlane Benhacene, Toulouse (FR); Denis Louviot, Colomier (FR)

(73) Assignee: ECOLE NATIONALE DE L'AVIATION CIVILE, Toulouse (FR)

(*) Notice: Subject to any disclaimer, the term of this patent is extended or adjusted under 35 U.S.C. 154(b) by 101 days.

(21) Appl. No.: 15/580,715

(22) PCT Filed: Jun. 10, 2016

(86) PCT No.: PCT/EP2016/063402
§ 371 (c)(1),
(2) Date: Dec. 8, 2017

(87) PCT Pub. No.: WO2016/198674
PCT Pub. Date: Dec. 15, 2016

(65) Prior Publication Data
US 2018/0188051 A1 Jul. 5, 2018

(30) Foreign Application Priority Data

Jun. 12, 2015 (EP) .................................. 15305914
Mar. 23, 2016 (EP) .................................. 16305324

(51) Int. Cl.
*G01C 21/34* (2006.01)
*G01C 21/36* (2006.01)
(Continued)

(52) U.S. Cl.
CPC ..... *G01C 21/3469* (2013.01); *G01C 21/3697* (2013.01); *G01C 23/00* (2013.01); *G01S 19/42* (2013.01); *G08G 5/0017* (2013.01)

(58) Field of Classification Search
CPC ........ G01C 21/00; G01C 21/26; G01C 21/34; G01C 21/36; G01C 21/3492;
(Continued)

(56) References Cited

U.S. PATENT DOCUMENTS 8,010,242 B1 * 8/2011 Ginsberg ............. G08G 5/0034
701/3
8,112,186 B2 * 2/2012 Sylvester ............... G01C 23/00
340/971

(Continued)

FOREIGN PATENT DOCUMENTS

WO 2015/153140 A1 10/2015

OTHER PUBLICATIONS

International Search Report for PCT/EP2016/063402, dated Sep. 22, 2016.
(Continued)

*Primary Examiner* — Yonel Beaulieu
(74) *Attorney, Agent, or Firm* — Meagher Emanuel Laks Goldberg & Liao, LLP

(57) ABSTRACT

The invention discloses a vehicle management system which is energy centric. The system may be configured to operate on a terrestrial vehicle, a nautical or on an aerial vehicle. It is configured to allow a user input a route comprising legs, each leg associated with an activity and an energy consumption mode. The system captures parameters from sensors or
(Continued)

sensor emulators to compute a position of the vehicle and a predicted energy consumption per leg. The system comprises a display unit which associates graphically the activities, their energy consumptions and their duration. It allows the user to simulate what-if scenarios, to continuously visualize the impact of modifications of some of the parameters of energy consumption on an energy/time/range budget. The invention discloses a vehicle energy management system wherein the simulation capability is configured to display the time spent on each activity in a scale which is commensurate to the energy consumption. The invention also discloses a vehicle energy management system wherein estimated variables which impact the energy consumption may be acquired by the system to validate the conditions under which the mission performed by the vehicle will be feasible. The invention may be adapted to other applications than vehicle energy management like project planning and electronic devices energy management, among other result oriented/resource constrained activities.

11 Claims, 17 Drawing Sheets

(51) Int. Cl.
*G08G 5/00* (2006.01)
*G01S 19/42* (2010.01)
*G01C 23/00* (2006.01)

(58) Field of Classification Search
CPC ..... G01C 21/3697; G01C 23/00; G01S 19/00; G01S 19/42; G08G 1/00; G08G 1/16; G08G 5/00; G08G 5/0017; G08G 5/0021; G08G 5/0034; G08G 5/0039
See application file for complete search history.

(56) References Cited

U.S. PATENT DOCUMENTS

| | | | | |
|---|---|---|---|---|
| 8,292,234 | B2* | 10/2012 | Shuster | G05D 1/105 |
| | | | | 244/175 |
| 8,594,918 | B2 | 11/2013 | Meyer-Ebeling et al. | |
| 9,423,799 | B1* | 8/2016 | Wu | G05D 1/042 |
| 9,567,099 | B2* | 2/2017 | Poux | G08G 5/0021 |
| 2005/0049762 | A1* | 3/2005 | Dwyer | G01C 23/00 |
| | | | | 701/3 |
| 2007/0150178 | A1 | 6/2007 | Fortier | |
| 2008/0300737 | A1* | 12/2008 | Sacle | G01C 21/00 |
| | | | | 701/3 |
| 2009/0150012 | A1* | 6/2009 | Agam | G01C 23/005 |
| | | | | 701/3 |
| 2015/0112526 | A1 | 4/2015 | Martin et al. | |
| 2015/0134206 | A1 | 5/2015 | Matsunaga et al. | |
| 2015/0279218 | A1* | 10/2015 | Irrgang | G08G 5/0039 |
| | | | | 701/3 |
| 2016/0085239 | A1* | 3/2016 | Boyer | G08G 5/0021 |
| | | | | 701/5 |
| 2016/0229554 | A1* | 8/2016 | Kawalkar | G01C 23/005 |
| 2016/0236790 | A1* | 8/2016 | Knapp | B64C 11/001 |

OTHER PUBLICATIONS

A. Jayakumar, F. Ingrosso, G. Rizzoni, J. Meyer and J. Doering, "Crowd sourced energy estimation in connected vehicles," Electric Vehicle Conference (IEVC), 2014 IEEE International, Florence, 2014, pp. 1-8.

* cited by examiner

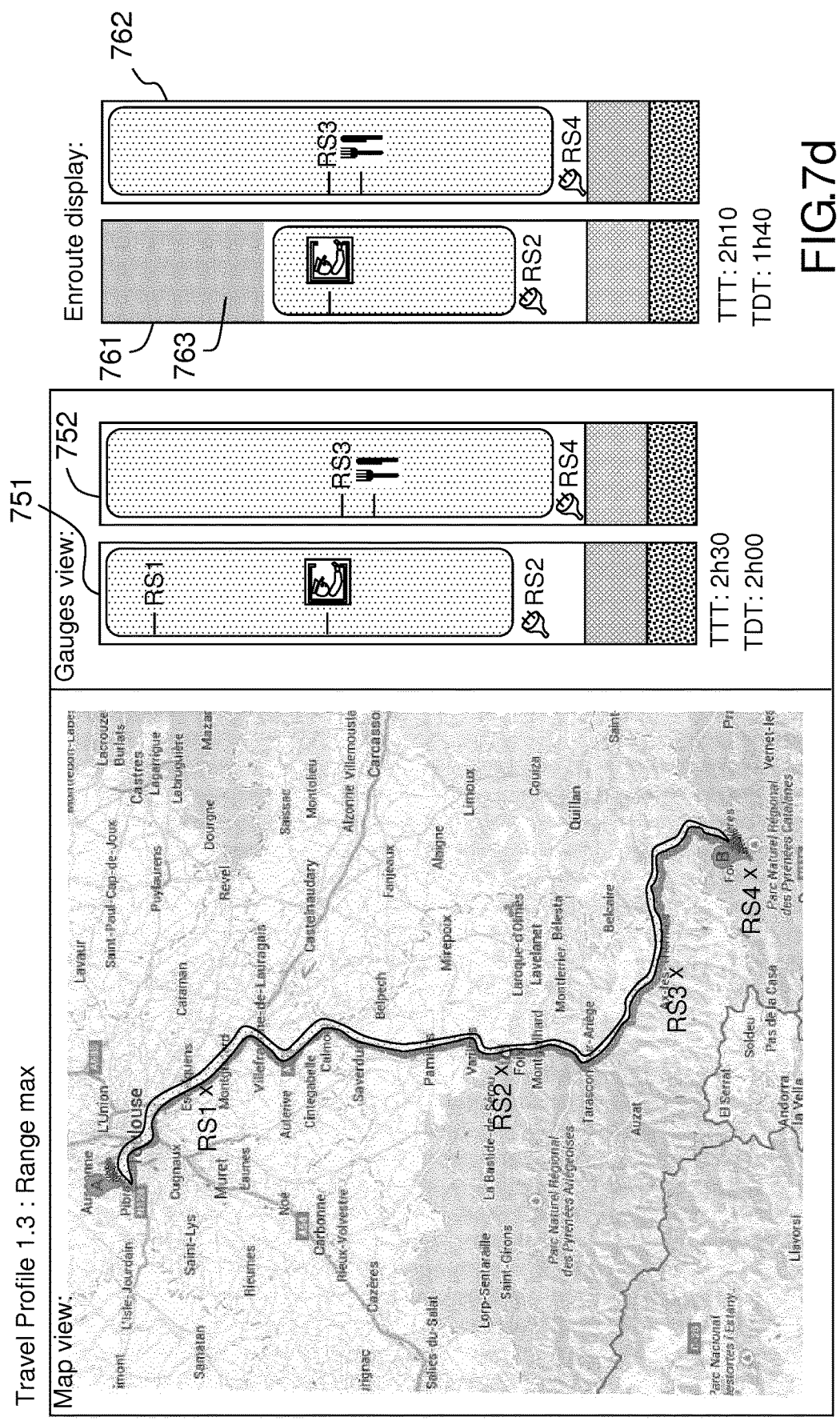

ACTIVITY BASED RESOURCE MANAGEMENT SYSTEM

FIELD OF THE INVENTION

The present invention applies to the field of resource management systems. More specifically, the invention allows a user or an object to plan and adjust its activities according to the evolution of consumption of resources, notably, but not only, for travel on-board a vehicle or using an electronic device.

BACKGROUND

Energy is an example of a resource on which a planning of activities on-board a vehicle is highly dependent. Terrestrial, nautical and aerial vehicles powered with one or more fuel engines have been equipped almost from the start with gauges to display to their driver or pilot an indication of the level of fuel in the tank(s), for example. Making sure that the vehicle had enough fuel to execute its travel plan was left to the driver/pilot. Of course, this task is notable for aircraft because in-flight refueling is currently limited to bombers or combat aircraft. Information on flight time/distance authorized with available fuel (i.e. endurance or autonomy) has long been provided to pilots on the dashboard or the cockpit display unit. The prediction is not too difficult for commercial airliners for which the route and flight parameters do not undergo a lot of variations, except from meteorological conditions, which can be predicted as well, at least in the short term.

The technology is also available on automotive vehicles, although an accurate prediction of the range that a vehicle will be capable of travelling on a route is more difficult because instantaneous, or essentially instantaneous, energy consumption will be heavily dependent notably upon the profile of the road to be travelled, the traffic conditions and the driving style, among other issues.

Being capable of providing reliable endurance predictions to a driver of an automobile has become a much more important issue when the automobile is powered, in whole or in part, by an electrical engine. This is because the autonomy of these vehicles is still rather low, as is the density of recharging stations, while the time needed for recharge is quite high. Solutions to this class of problem have been thought of, notably by using the information available from the car navigation system. An example of such a solution is disclosed by U.S. Pat. No. 8,594,918. However the system disclosed by this document does not allow a driver to easily plan a travel with a plurality of activities, which may be more or less critical or of a higher or lower priority, and to execute 'what if' simulations to be able to make the best informed decision on the optimum allowable travel plan, either at the preparation stage or en-route.

Also, electric aircraft are now developed, and energy management becomes more safety critical, while the pilots will still be overwhelmed by the existing safety parameters. In the avionics field, it also therefore becomes all the more important to change the paradigm of energy management and make it more activity based, so that a pilot can easily determine the activities that he or she can decide to safely perform in his/her flight plan within the remaining autonomy of the aircraft.

European patent application no 15/305914 assigned to the same applicant provides a solution to this problem. The current invention solves further relevant issues, notably in view of variations of external factors.

SUMMARY OF THE INVENTION

It is an object of the invention to provide these improvements over the prior art.

It achieves this goal by providing a vehicle route management simulation and monitoring system with a capability to allocate an energy resource to an activity of the vehicle, monitor and adapt activity planning, jointly display the forecast and actual allocation, including in terms of time allocated to each activity and variations of the allocations as a function of one or more external factors.

The invention discloses a vehicle route management simulation and control system comprising: an input interface configured to allow input of a route with a plurality of waypoints, said waypoints defining segments, each segment associated with an activity and an energy consumption mode; a plurality of one or more of sensors or sensor emulators configured to provide one or more of a position or an estimate of a position of the vehicle relative to the route, one or more of an amount of remaining energy or an estimate of an amount of remaining energy and measurements or estimates of variables impacting energy consumption; a calculation unit configured to: i) associate a predicted energy consumption to each segment of the route, based on vehicle features, segment features and the energy consumption mode associated by the user with the segment; ii) compute a predicted total energy consumption for the route; iii) adjust the predicted energy consumption associated to each segment of the route and the total energy consumption for the route based on outputs from the plurality of the one or more of the sensors or the sensor emulators; a display unit configured to present outputs of the calculation unit and outputs of some of the plurality of the one or more of the sensors or more of the sensor emulators; wherein the display unit is further configured to graphically present the predicted total energy consumption for the route by activity.

Advantageously, the calculation unit is further configured to simulate an impact of a modification of the inputs on the predicted total energy consumption for the route by activity.

Advantageously, the display unit is further configured to display one or more of a start time, an end time of an activity, or a duration of an activity.

Advantageously, the display unit is further configured to visualize a number of elementary time units of the duration of an activity.

Advantageously, the display unit is further configured to display an input interface to receive inputs from one or more of a user or one or more of the sensor emulators, said inputs being representative of estimates of the variables impacting energy consumption.

Advantageously, the estimates of the parameters impacting energy consumption comprise one or more of a speed or a direction of wind, a variation in altitude of the vehicle, a density of traffic or a weight or a volume of a payload of the vehicle.

Advantageously, the vehicle route management simulation and control system of the invention comprises a simulation subsystem and a control subsystem which are configured to transfer data to one another, in one or more of a real time mode and a time-differed mode.

Advantageously, the calculation unit is further configured to simulate an allocation of a cost budget to a selection of activities, wherein said cost budget is a weighted combination of energy, time, range and payload.

Advantageously, the vehicle is an automotive vehicle.

Advantageously, the predicted energy consumption of a segment depends on at least one of a vertical profile of the segment, current traffic conditions on the segment, predicted traffic conditions on the segment, a driving style of a user.

Advantageously, the vehicle is an aircraft.

The invention also discloses a method for managing a route of a vehicle, said method comprising: receiving input, via an input interface, a route with a plurality of waypoints, said waypoints defining segments, each segment associated with an activity and an energy consumption mode; capturing from a plurality of one or more of sensors and sensor emulators one or more of a position or an estimate of a position of the vehicle relative to the route, an estimate of an amount or an amount of remaining energy and measurements or estimates of parameters impacting energy consumption; Causing a calculation unit to: i) associate a predicted energy consumption to each segment of the route, based on vehicle features, segment features and the energy consumption mode associated by the user with the segment; ii) compute a predicted total energy consumption for the route; iii) adjust the predicted energy consumption associated to each segment of the route and the total energy consumption for the route based on outputs from the plurality of the one or more sensors or sensor emulators; presenting on a display unit outputs of the calculation unit and outputs of some of the plurality of the one or more sensors or sensor emulators; wherein the presenting comprises graphically presenting the predicted total energy consumption for the route by activity.

The invention also discloses a computer program for managing a route of a vehicle when executed on a computer, comprising: input interface components configured to allow a input of a route with a plurality of waypoints, said waypoints defining segments, each segment associated with an activity and an energy consumption mode; sensor or sensor emulator processing instructions configured for capturing from a plurality of one or more of sensors or sensor emulators one or more of a position or an estimate of a position of the vehicle relative to the route, an amount or an estimate of an amount of remaining energy and measurements or estimates of variables impacting energy consumption; data processing instructions configured to: i) associate a predicted energy consumption to each segment of the route, based on vehicle features, segment features and the energy consumption mode associated by the user with the segment; ii) compute a predicted total energy consumption for the route; iii) adjust the predicted energy consumption associated to each segment of the route and the total energy consumption for the route based on outputs from the plurality of the one or more of the sensors or the sensor emulators; presentation components configured to present on a display unit outputs of the data processing instructions and outputs of at least one of the plurality of the one or more sensors or sensor emulators; wherein the presentation components are further configured to graphically present the predicted total energy consumption for the route by activity.

The invention also discloses a vehicle route management unit comprising: an interface to an input interface configured to allow input of a route with a plurality of waypoints, said waypoints defining segments, each segment associated with an activity and an energy consumption mode; an interface to a plurality of one or more of sensors or sensor emulators configured to provide one of a position or an estimate of a position of the vehicle relative to the route, an amount or an estimate of an amount of remaining energy and measurements or estimates of variables impacting energy consumption; a calculation unit configured to: i) associate a predicted energy consumption to each segment of the route, based on vehicle features, segment features and the energy consumption mode associated by the user with the segment; ii) compute a predicted total energy consumption for the route; iii) adjust the predicted energy consumption associated to each segment of the route and the total energy consumption for the route based on outputs from the plurality of the one or more sensors or sensor emulators; an interface to a display unit configured to present outputs of the calculation unit, outputs of some of the plurality of the one or more sensors or sensor emulators and graphical views of the predicted total energy consumption for the route by activity.

According to the invention, simulation and/or monitoring of activity-based energy consumption of a vehicle may be performed either at a preparation stage of a mission of the vehicle or during execution of the mission.

The invention also brings an enhanced planning capability by giving the user/planner enhanced awareness of a relationship between energy and time spent on each activity in the mission.

The invention also brings significant flexibility to the planning capability of the vehicle energy management system by allowing to vary a number of parameters, such as wind speed and direction, variation of altitude, traffic, payload, etc., which impact significantly the energy consumption to simulate the same and on the time needed to perform the mission. Thus, conditions which render the mission totally impossible to achieve due to a variation of one of these external factors will become apparent, and the system may then lead to the conclusion that a global reforecast of the mission is mandatory, i.e. change of route between waypoints, inversion of a closed circuit, cancellation of one or more waypoints, diminution of a weight of a payload, change of start and end time, change of day, etc.

A resource management system according to the invention may also be used for planning a mission which is not performed with a vehicle but is also structured in activities which may be consumed with more or less intensity, for instance a project which is staffed by a varying number of people depending on the phase/work package.

Also, an energy management system for a mobile portable device according to the invention may be used for adapting the energy consumption mode to usage scenarios of the device and some environment parameters. Indeed, one may also see the benefits brought by the invention to the energy management and henceforth the operational capabilities, of a number of autonomous objects like robots, humanoids or not, "things" of the Internet of Things, Micro Electro Mechanical Systems for medical applications, etc. . . .

BRIEF DESCRIPTION OF THE DRAWINGS

The invention will be better understood and its various features and advantages will become apparent from the description of various embodiments and of the following appended figures:

FIGS. 7*a* to 7*d* represent a car navigation display with energy gauges in different configurations;

DETAILED DESCRIPTION

Figure 1:
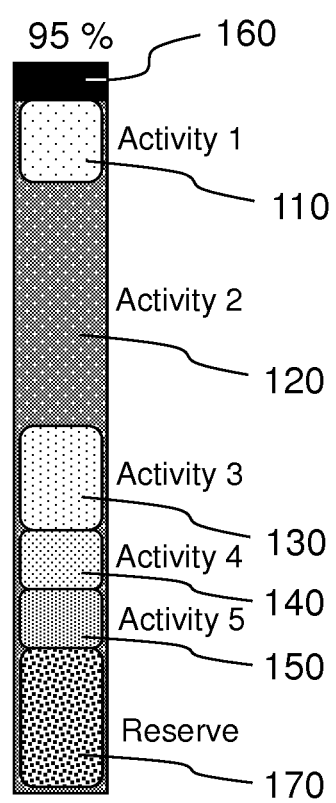
FIG. 1 displays an energy gauge with allocation of future energy consumption to a set of activities of a vehicle.

FIG. 1 displays an energy gauge with allocation of future energy consumption to a set of activities of a vehicle.

According to an aspect of the invention disclosed by European patent application no 15/305914, when a mission consisting of a list of activities, Activity 1, 110, Activity 2, 120, Activity 3, 130, Activity 4, 140, Activity 5, 150, is planned, the total predicted energy consumption (based on specific parameters depending on any of the vehicle, the route or the pilot/driver) is displayed, each zone of the gauge being allocated to an activity, with, possibly, a first additional zone allocated to the energy remaining after all activities have been performed, and a second additional zone being allocated to an energy reserve. In this case, current state-of-charge (SoC) is 95% and the activities will consume a percentage of 95%, displayed at area 560, of the available energy, excluding reserve, 170.

Advantageously, the surface of each zone of the gauge will be proportional to the proportion of the energy consumption allocated to the corresponding activity. In a number of embodiments, a color code and/or pictures can facilitate identification of types of activity and/or of their criticality.

Figure 2:
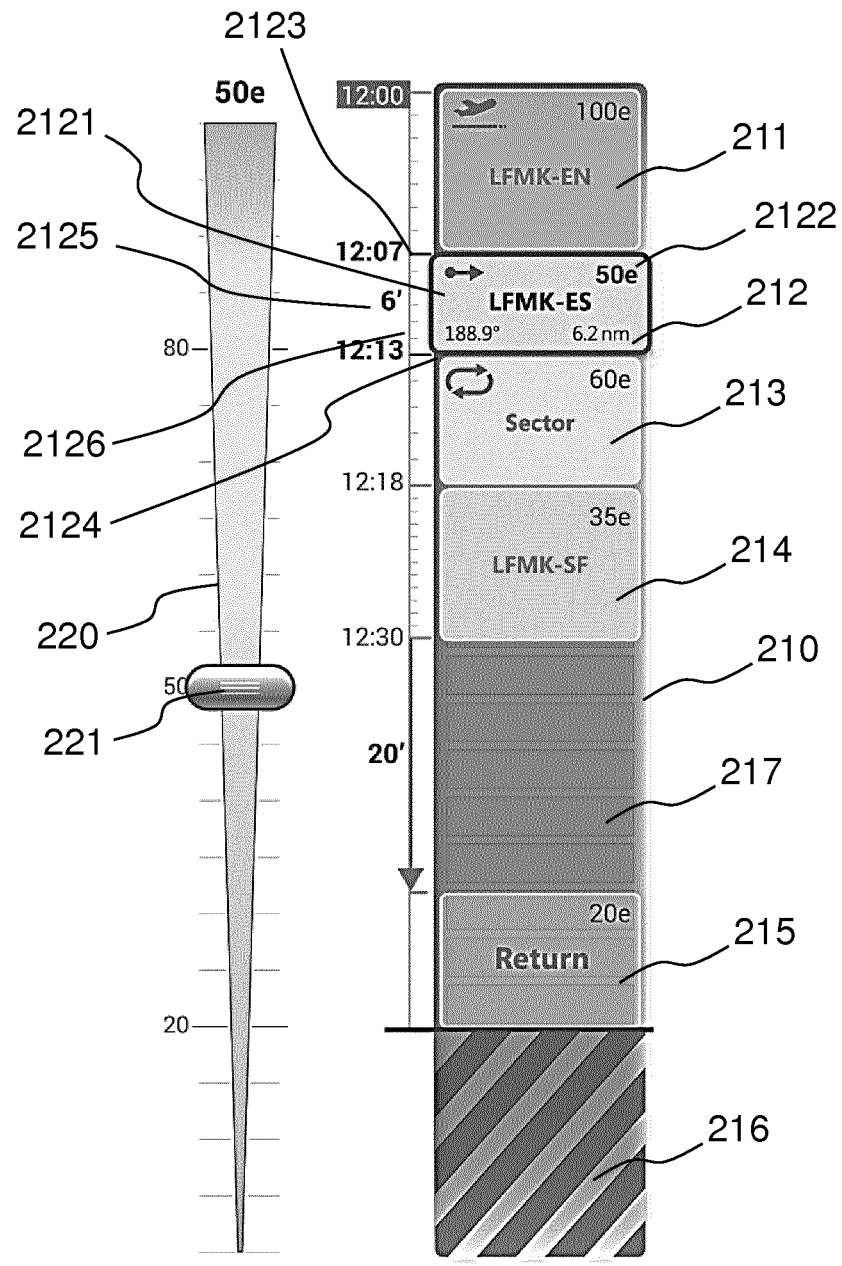
FIG. 2 represents a gauge according to the invention with an indication of start and end time of each activity.

FIG. 2 represents a gauge according to the invention with an indication of start and end time of each activity.

The example which is illustrated is an aircraft, but the same gauge configuration can equip an automotive vehicle or a maritime vessel, the variations being commented upon at each relevant part of the description below. The gauge may be a real gauge embedded in a tactile dashboard of a vehicle, or it may be a virtual gauge embedded in a virtual dashboard on a simulation device (a PC or a tablet for instance) used by a user to prepare his/her mission.

The gauge 210 on the right side of the figure has the form of a bar and is segmented into different activities 211, 212, 213, 214. For instance, when the vehicle is an aircraft, activity 211 may be take-off, activity 212 may be travelling a leg, activity 213 may be holding above a waypoint, activity 214 being travelling another leg. Then activity 215 is going back to the base (or Return). Area 216 represents a reserve of energy which cannot be used for the activities. In the case of an automotive vehicle, activity 211 may be going out from a town, activity 212 may be travelling a segment of a highway, activity 213 may be going through a village, and activity 214 may be travelling another segment of a highway.

In this representation, the portions of the bar for each activity have a color or a tone which depends on the energy consumption mode assigned to the vehicle for each activity.

The energy consumption mode depends on the power at which the engine operates which itself depends on the targeted travel speed. The energy consumption mode may be selected by the user. Then, the actual energy consumption will depend on the specific conditions of travel (for instance for a vehicle, it may be: resistance of air and/or terrain; traffic conditions; payload, etc.

The energy consumption mode may be selected among a number of possible discrete values, for example:

Standard, i.e. the vehicle travels at the maximum operating speed;

Comfort, i.e. the vehicle travels below the maximum authorized speed, e.g. at 80% of the maximum authorized speed;

Economy, i.e. the vehicle optimizes its energy consumption.

These discrete values may be set by the platform (i.e. aircraft or car) manufacturer. They may be set at a percentage of the speed limit fixed by the authorities for a definite type of road, segment of road or environment (i.e. country, suburbs, center of town, etc.) The speed limits applicable for a road segment are now commonly available from most car navigation systems. Also, the discrete values may be adaptive as a function of some route profile, environmental or user defined variables like route altitude variation, wind direction and/or speed and vehicle payload. For instance, a significant tail wind will allow the percentage of the speed limit for the economy mode to be set at a higher value than if there is a significant head wind.

The energy consumption mode may also be selected on a continuous scale. This variant is illustrated on FIG. 2 where a slider 221 on a bar 220 on the left side of the figure allows the user to vary the percentage of maximum consumption on scale from 100% to 0% by moving the slider on the bar. The appropriate value is selected by the user to be assigned to an activity with the slider when the said activity is selected on the activity bar 210, which is the case of activity 212 on the example illustrated by the figure.

Different elements may be displayed on the activity bar 210. For instance, for activity 212, which is selected on activity bar 210:

The nature of the activity or of the leg, 2121,

The energy consumption mode or value, 2122, in this example 50%;

The start time of the activity, 2123, in this example 12:07;

The end time of the activity, 2124, in this example 12:13;

The duration of the activity, 2125, in this example 6 mn.

A time scale 2126 may be advantageously positioned alongside the activity bar 210. It has a number of ticks (in this example 6) which is proportional to the duration of the activity, so that the user can visualize in a convenient manner the consumption of energy per unit of time.

In the variant of the figure, the energy gauge maps a quantity of energy to the Y coordinate of the screen. The whole amount of energy is mapped to Y with a single, linear, quantitative scale. Thus, each leg has a height that is proportional to the quantity of energy consumption. In order to indicate the start time, end time and duration of a leg, a text representing the said information is displayed next to the beginning (top) and the ending (bottom) of the representation of a leg, or in the middle of a leg for the duration.

Absent any other indication, such representation could mislead the user because he may misinterpret the height of a leg as a single, linear, quantitative mapping of time instead of energy consumption. As two different legs may use different values of e-mode, a similar height for the two legs could actually refer to two different durations.

Thanks to the ticks 2126 on the time scale, the user is made aware of that particular aspect of the representation of time. In this example, the representation displays a tick for each minute on the time scale, but other values may of course be selected depending on the use case. Hence, the density of ticks depends on the ratio between the amount of energy required by an activity and its duration: the more an activity lasts, the denser the ticks are. For example, on FIG. 2, activity 213 starting at 12:13 has a duration of 5 minutes, while the activity starting at 12:18 has a duration of 12 minutes, though both activities have similar height. However, the difference of density of ticks on the time scale reflects the difference of duration. Not only is the user no longer misled, but he can estimate the duration of a leg by perceiving its associated tick density, without even needing to read the duration of the activity on the display (which in this case is not displayed).

In an embodiment, the user can also switch to a reverse mode of mapping where time would be mapped to a single, linear, quantitative scale, while ticks would indicate the quantity of energy spent during the duration of a particular leg. The selection between the two display modes may be made a click on a radio-button (not represented on the figure)"linear scale" with two entries "time" and "energy".

Figure 3:
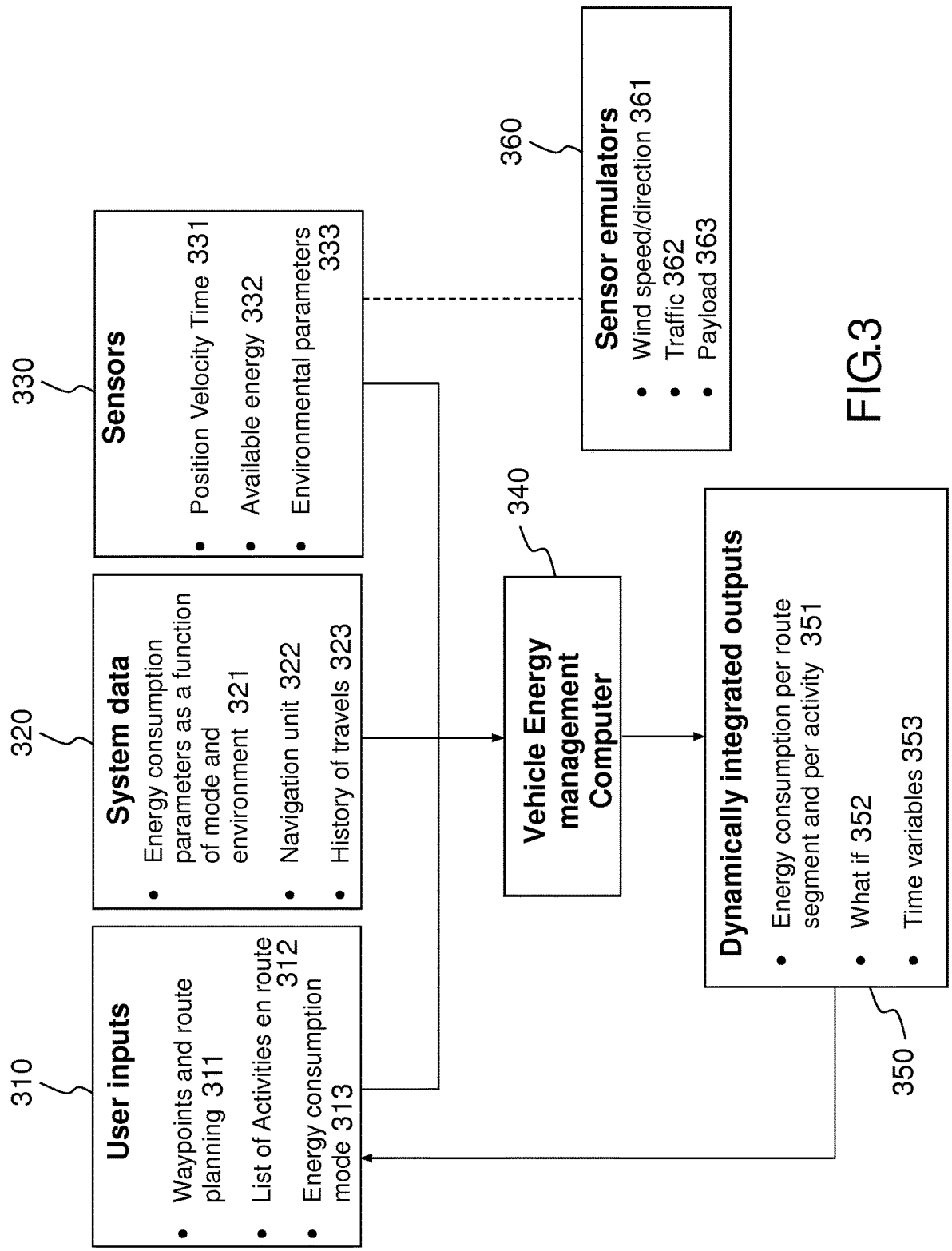
FIG. 3 represents a functional architecture of a vehicle energy management system in a number of embodiments of the invention in different types of vehicles according to a number of embodiments of the invention.

FIG. 3 represents a functional architecture of a vehicle energy management system in a number of embodiments of the invention in different types of vehicles.

In a general construction of the invention a vehicle in which the invention may be implemented may be terrestrial, nautical or aerial. The size of the vehicle may vary widely, from a military transport aircraft or a tanker to a microdrone. Electronic devices may even be of a nano-size like some MEMS medical devices.

The route management system of the invention comprises a user input interface, 310, whereby a user will be required to input a number of variables. The user input interface may be located in the vehicle or device or may be physically independent from the vehicle or device.

The route management system of the invention may operate in a simulation mode, where the data input in the input interface do not actually control the operation of the vehicle or in a control mode where the data input will direct the operation of the vehicle.

Input may be made using a data transfer from a file through a port of the computer, when data has been prepared in advance of the start of the mission. It can also be transferred through a network connection (wired or wireless). Input may also be made using a keyboard, a mouse, a joystick or a voice recognition interface. Part of the data to be input may use any of these data entry interfaces, or a combination thereof.

A first of the items to be entered is a route with a plurality of waypoints (311). Two successive waypoints define a "segment". A segment may be rectilinear or curvilinear. The user may be invited by the user interface to enter only a destination point and, optionally stops en-route. The user will be then proposed a number of possible routes. In an option, if the total available energy is not enough to reach the destination point, the system may calculate an itinerary that will stop by a recharge/re-fuelling station. Therefore, the user input interface may receive data from the system data repository and from sensors (for instance an energy level sensor, a wind sensor, a light sensor or others).

A segment has an activity associated herewith (312). By default, the activity associated with a segment is going from the waypoint at the beginning of the segment to the waypoint at the end of the segment. An activity may be selected in types of activities, said types being dependent on the vehicle and the missions it performs.

According to the invention, an energy consumption mode (313) is associated with a segment. As indicated above, energy consumption modes may be defined in a discrete manner, for example with two values, standard and economy, or three values, standard, comfort and economy. Energy consumption modes may also be defined by a continuous variable, between a minimum percentage of total power level to a maximum power level.

Optionally, entry of other data may be required from the user, for instance breaks after a predetermined maximum driving time, etc. . . . Optionally, the amount of data that a user is requested to input may be minimal, for instance when a predetermined list of missions with preselected segments, activities and associated energy consumption have been previously entered, and the user only has to select in the list of missions the one he/she wants to execute.

A system data repository 320 stores and updates data which are necessary or useful to enable the system of the invention to deliver its outputs. Notably, the system data will comprise energy consumption parameters, 321. The parameters may be stored in tables specific to a vehicle model, and possibly specific to the very vehicle in which the system is embedded. Indeed, energy consumption may vary with the precise configuration of the vehicle (engine(s), batteries, form factor, number of seats, tires, load, etc. . . . ), the age of the vehicle and the time elapsed from the last maintenance operation. The parameters will vary as a function of the energy consumption modes. Depending on the type of vehicle (see below), the energy consumption parameters will also vary with the vertical profile of the itinerary, the traffic density, the wind speed and direction, the piloting or driving style. Therefore, the combinations of causes of variations of the energy consumption parameters may be very numerous. In an embodiment, it may be advantageous to use functional relationships between the parameters and the variables previously cited. In another embodiment, it may be advantageous to store the parameters in *abaci* (i.e; tables of parameters values), using interpolations between the values of the variables which define the parameters in the *abaci*. In another embodiment, computations may be based on a physical model and real-time simulation. In another embodiment, the computations and/or parameters may be made user dependent, for instance in terms of preferences, i.e. set the maximum energy consumption mode not at the speed limit, but at 80% of the speed limit.

The system data repository 320 also comprises a navigation unit, 322, with a map of the areas to be travelled and a route management system, capable of computing a route from a departure point to a destination point with all waypoints in between which may be of interest to the user. The navigation unit may only accept inputs which are made while the user is on-board the vehicle. Or it may also accept inputs transferred from a memory or from a computing device via a wired or a wireless connection, where these inputs have been prepared out of the vehicle and before the start of the mission. The navigation unit should be able to compute a number of possible routes based on a distance, time or energy optimization algorithm (or any combination thereof).

The navigation unit may also accept inputs which are made from a remote control interface, for instance when the vehicle is a drone, a pilotless aircraft or a pilotless car. The navigation unit may be loaded with an original flight plan or route and then get change commands from the remote control interface while the vehicle is in operation, said change commands being entered by an operator or generated automatically by a route planner. The communication link between the navigation unit and the remote control interface may be RF (Bluetooth, Wi-Fi, cellular, satellite, etc.) or optical, and will be preferably secured.

The system data repository 320 may also comprise a history of previous travels of the vehicle, 323, possibly classified by driver/pilot and time referenced. The previous travels may be classified based on an efficiency factor, globally or for a same departure and a same destination, or for a same route, or on ranking criterion of a user.

Other system data may be useful to implement the invention, for instance data from the electronic control unit diagnosis in a car or from the control systems of an aircraft (like for instance total weight on takeoff).

When operating in a control mode, the route management system of the invention also comprises sensors, 330. The sensors should be capable of acquiring a Position Velocity and Time (PVT) of the vehicle (331). Often, this will be a GNSS positioning receiver. Such a receiver is configured to process the navigation signals received from a number of satellites of one or more constellations (GPS, Glonass, Beidou, Galileo, etc. . .), calculating a pseudo-range between the receiver and each satellite and then calculating a PVT from a minimum of four satellites. Depending on the configuration of the receiver, the relative position of the satellites and the receiver, the conditions of reception, the use of corrections, the precision of the calculation of the PVT may vary from 10 m down to 1 cm. To increase the precision, the GNSS positioning receiver may be aided by an inertial navigation system using accelerometers, gyroscopes and magnetometers to propagate a GNSS position. Also positioning on a map will increase the precision of the position, if the map is very precise. An alternative positioning system could be based on a LPS (Local Positioning System) network.

Sensors also comprise an energy level gauge, 332, which delivers an absolute level of the remaining energy. In case there is a plurality of tanks or batteries, like on an aircraft, there may be a gauge for each tank or battery, possibly in addition to a consolidated gauge.

There should also be sensors 333 which measure environmental parameters which heavily impact energy consumption like actual slope of the road or actual traffic for a car (to be compared with the ones predicted by the navigation unit) and instantaneous wind. The environmental parameters may also come from an information channel accessed through a wireless communication channel, for instance meteorological data (actual or predicted).

When operating in a simulation mode, according to the invention, as illustrated further down in the description, the route management system of the invention comprises sensors and/or sensor emulators, 360. According to the invention a sensor emulator is a computer implemented input interface which allows a user to vary a value of an environmental or user dependent parameter which impact energy consumption, for instance wind direction and/or speed, traffic density, payload, etc.

The route management system of the invention may comprise both sensors 630 and sensor emulators 660 to be able to operate both in full simulation mode and in control mode. In this specification, a limited simulation mode is a simulation mode where energy consumption mode and route can be varied by activity to simulate the impact on energy consumption. Enhanced simulation mode means a simulation mode where, in addition to the parameters which the user may change in the limited simulation mode, the environmental parameters affecting energy consumption and some user dependent parameters may be simulated by the user.

The invention may be implemented in a vehicle energy management computer, 340. The computer may be a dedicated hardware with a specific software implementing the methods of the invention. Or it may be a specific software running on a computer which is dedicated to another task on the vehicle. Given the integration of the data and calculations of the invention with the navigation data, it may make sense to implement the energy management functions in the hardware which handles the route planning and navigation functions of the vehicle. In an aircraft, this will normally be the flight management computer (FMC). In a terrestrial vehicle, the most efficient module would probably be the car navigation system. Whatever the design of the architecture of the vehicle management device, it will probably be necessary to use processors which are compatible with the main standards of the automotive or aerospace industry, notably in terms of reliability, endurance and safety. For instance, on an aircraft, the FMC may comprise two redundant processing capabilities, as well as redundant data buses and data storage facilities. Also data exchange standard formats have been defined in both industries and have to be complied with. Optionally, data and/or the communication links may be encrypted.

The Vehicle Energy Management computer calculates a number of outputs 350 which are made available to the user in a dynamic and integrated way.

Energy consumption per route segment per activity, 351, is calculated based on the energy consumption parameters, the energy consumption mode, and the environmental parameters captured by the sensors. This calculation can be made before departure, when preparing the mission, and it will be repeated dynamically while the vehicle is en-route, at defined intervals, for instance at a frequency between 1 and 30 Hz, based on actual system and sensor data or information about environmental parameters ahead of the vehicle. Some use cases may justify lower or higher frequencies. The result of the calculation is displayed to the user on a gauge display of the type illustrated on FIG. 1 or 2.

In the case of the gauge of FIG. 2, an activity bar will display each activity with a height proportional to the energy consumption of the activity. Time variables (start and end time of each activity, duration of each activity, ticks on the timeline) may also be displayed. Alternatively the activity bar will display each activity with a height proportional to the duration of each activity. Energy consumption may be displayed in addition, with ticks along the energy consumption scale, the number of which will be proportional to the number of units of energy consumed during an activity.

The user will be given the opportunity of performing 'what if' simulations, 352. These simulations being use case dependent, they will commented upon with more details in relation to the specific embodiments commented upon further down in the description. The common features of these simulations are that the user is given the opportunity to enter variants of energy consumption modes or to alter the route (adding detours, new legs, new exercises, etc. . .) and measure the impact on the allocation of the remaining energy to the remaining activities, two gauge views may be visible on the dashboard, to allow a comparison between the initial scenario and the alternative scenario.

Also, more advanced 'what if' simulation functions may be offered to the user, some of which will be commented upon further down in this description. For instance, a simulation of an allocation of a cost budget to a selection of activities, wherein said cost budget is a weighted combination of energy, time and range. For example, the driver could choose to minimize his/her driving time or environmental footprint, or he/she could choose to maximize endurance or range. This may be the case for a guided vehicle or a robot, for instance in an environment contaminated by radiation or pollutants.

In a variant of the invention, data may be sent from the Vehicle energy management computer to a vehicle fleet management system, so that a fleet manager can perform on his/her end 'what if' simulations to optimize travels of the vehicles of the fleet present in an area or tasked with a similar activity potentially by re-allocating tasks.

Figure 4:
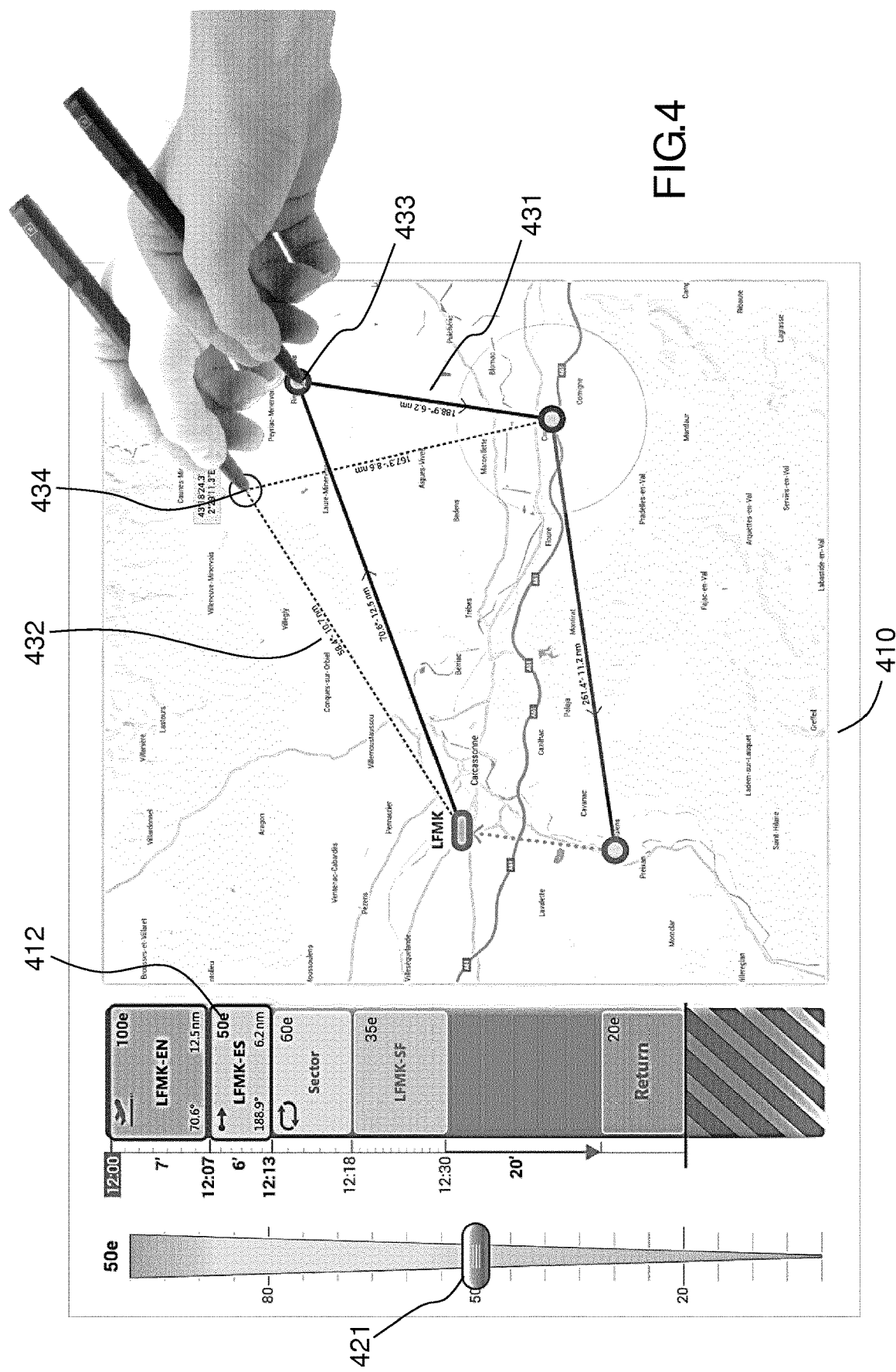
FIG. 4 illustrates a simulation of a variation of a number of travel parameters, in some embodiments of the invention.

FIG. 4 illustrates a simulation of a variation of a number of travel parameters, in some embodiments of the invention.

Going faster consumes much more energy than going slower. The relationship is not linear: roughly the energy consumption varies with the square of the speed, all other factors being constant. Even if a user can arrive to the destination sooner when going faster and thus spending less travel time en route to arrive at destination, he will spend much more energy and may have to stop to refuel, thus increasing the total travel time including stops. Alternatively, going more slowly may enable the user to go farther. The vehicle energy management system of the invention allows the user to directly find the maximum speed of travel with a slider, in order to investigate the impact of speed on energy consumption. The user can also directly manipulate the waypoints on the map in order to investigate the maximum reachable distance (FIG. 4).

The gauge of FIG. 2 is represented on FIG. 4 integrated in a dashboard of a vehicle. FIG. 4 illustrates an embodiment of the invention applied to an aircraft, but it may be easily applied to an automotive vehicle. In this case, the legs between the waypoints will not be linear but curvilinear. For simulating an impact of a change, the navigation unit is capable of calculating the curvilinear legs representing different possible routes to travel from a first waypoint to a second waypoint.

When activity 412 is active, it is possible to move the slider 421 to change the energy consumption mode, for instance from 50% to 60%. In a variant, it is possible to add an increase or to subtract a decrease to the energy consumption of all activities at the same time (provided that the energy consumption of each activity remains higher than 0%, or than a predefined threshold, and lower than 100%), using a button or another slider (not represented on the figure).

It is also possible to simulate the impact of a change of a route 431 into a new route 432 by moving a waypoint at position 433 to a position 434. The vehicle energy management simulation and control system will calculate the new values of activity parameters (energy and time budgets) and simultaneously update the representation of these parameters on the activity gauge. Other scenarios may also be tested: cancellation of a waypoint, change of orientation of travel on a circuit.

Also, using the interactive graphical interface of the invention depicted notably on FIG. 4, the user can directly manipulate the legs/activities on the gauge and control their duration. Thus a user can manipulate an arrival time for a leg in order to meet a deadline (e.g. a rendezvous), and investigate the impact of a faster travel on energy consumption. Direct manipulation of an arrival time of a leg in the energy gauge triggers the vehicle energy management computer to compute the energy consumption according to the time target. The continuous feedback is a color change since it represents the leg speed. The speed slider moves at the level corresponding to the computed speed. In this mode, the change in end time for an activity is not propagated to the earlier activities—only to the later activities. It is also possible to have the system operate in a variant, where the change of end time is propagated up to the beginning of the mission, the speed at which all upstream activities are performed being adjusted proportionally up to the start of the mission. In another variant, it is possible to subtract a time interval from the total travel time or to add a time interval to the same, and simulate the impact on the speed at which all activities have to be performed within the 0-100% of maximum energy consumption interval.

The simulations of a change of speed, a change of route and a change of time of arrival or departure may be combined to explore the various options and find heuristically the preferred ones according to one or several criteria (time of arrival, total energy consumption, total travelled time, etc.).

Figure 5A:
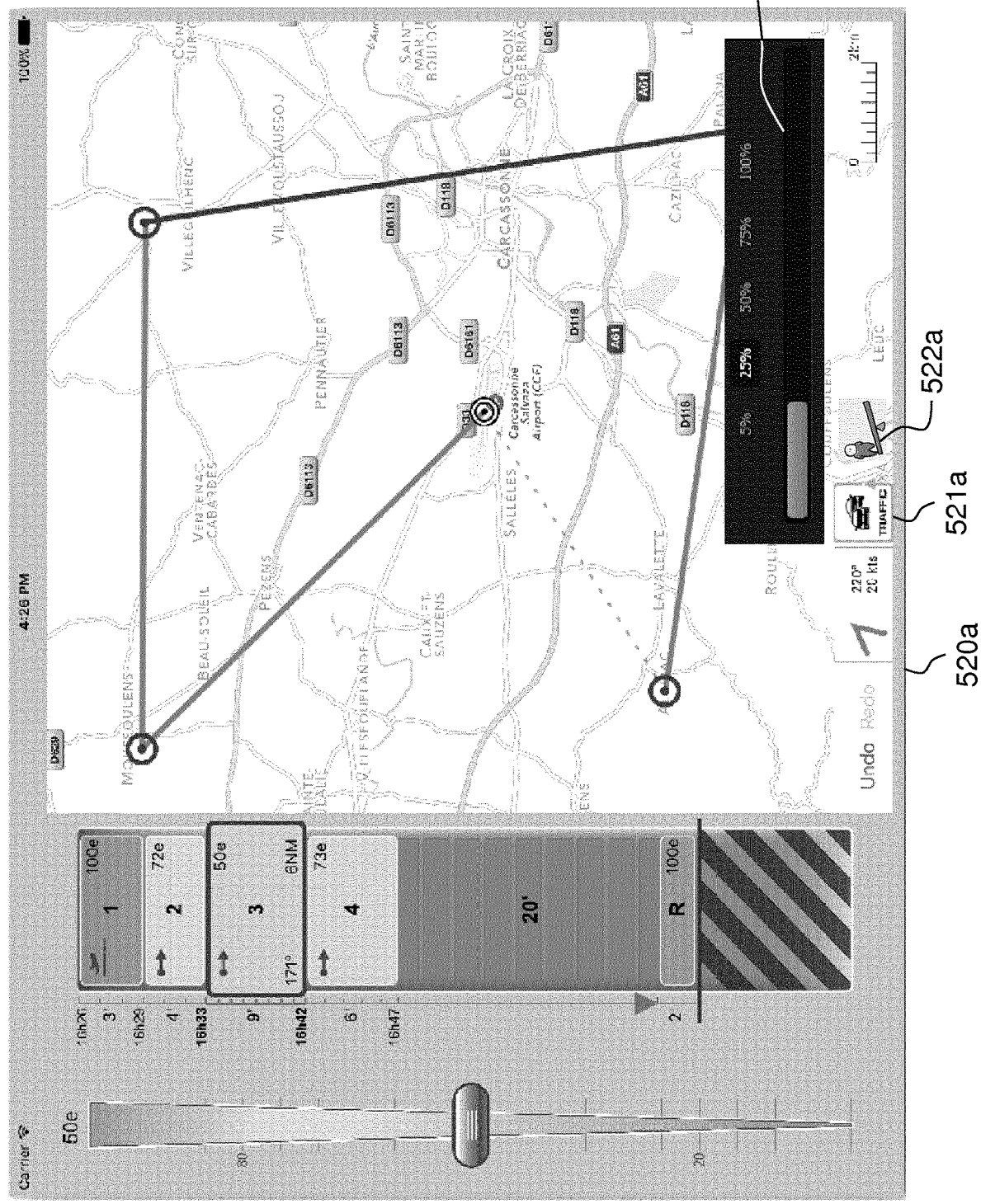
FIGS. 5*a*, 5*b* and 5*c* illustrate simulations of variation of a number of environmental or used defined parameters, in some embodiments of the invention.
Figure 5B:
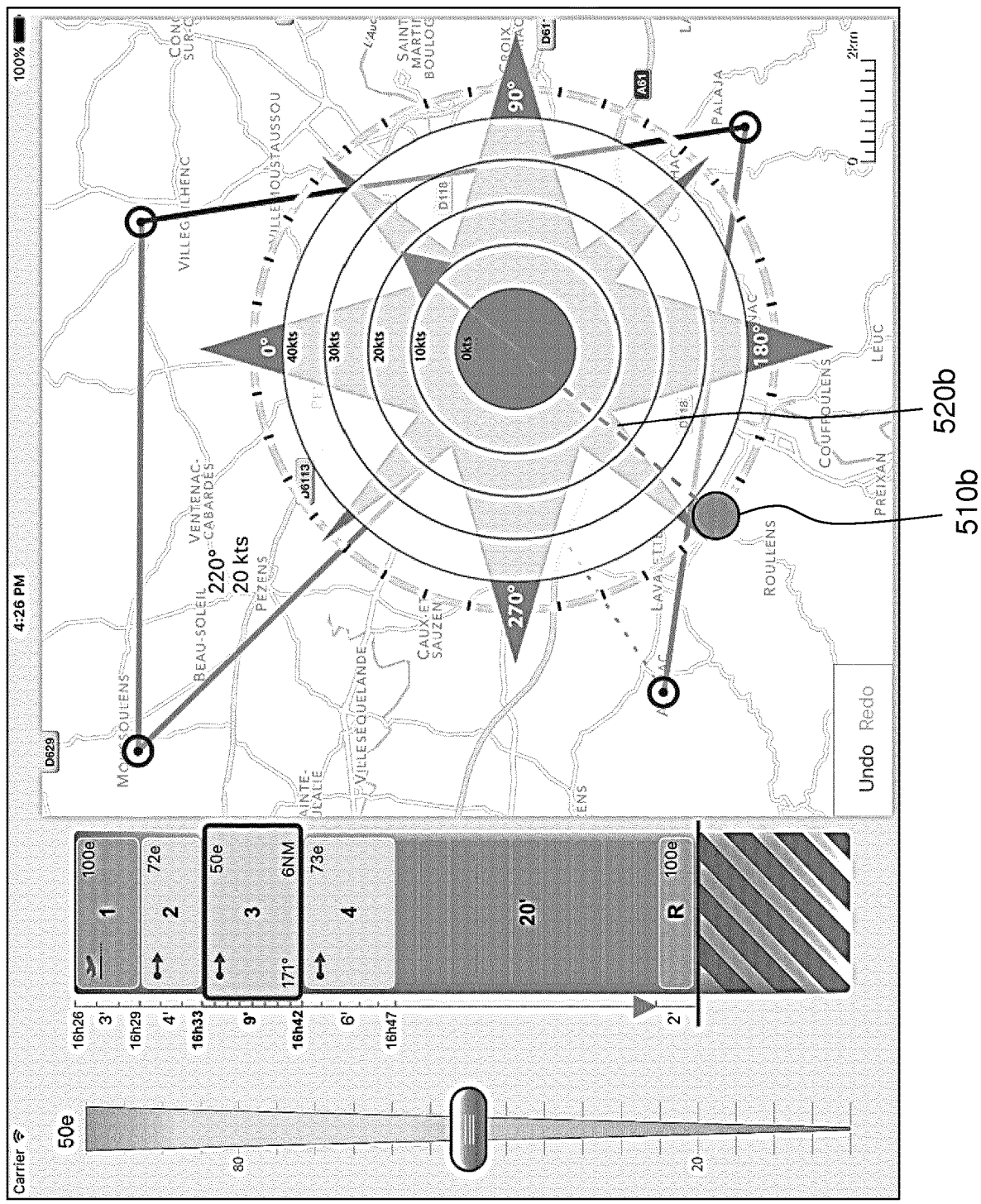
Figure 5C:
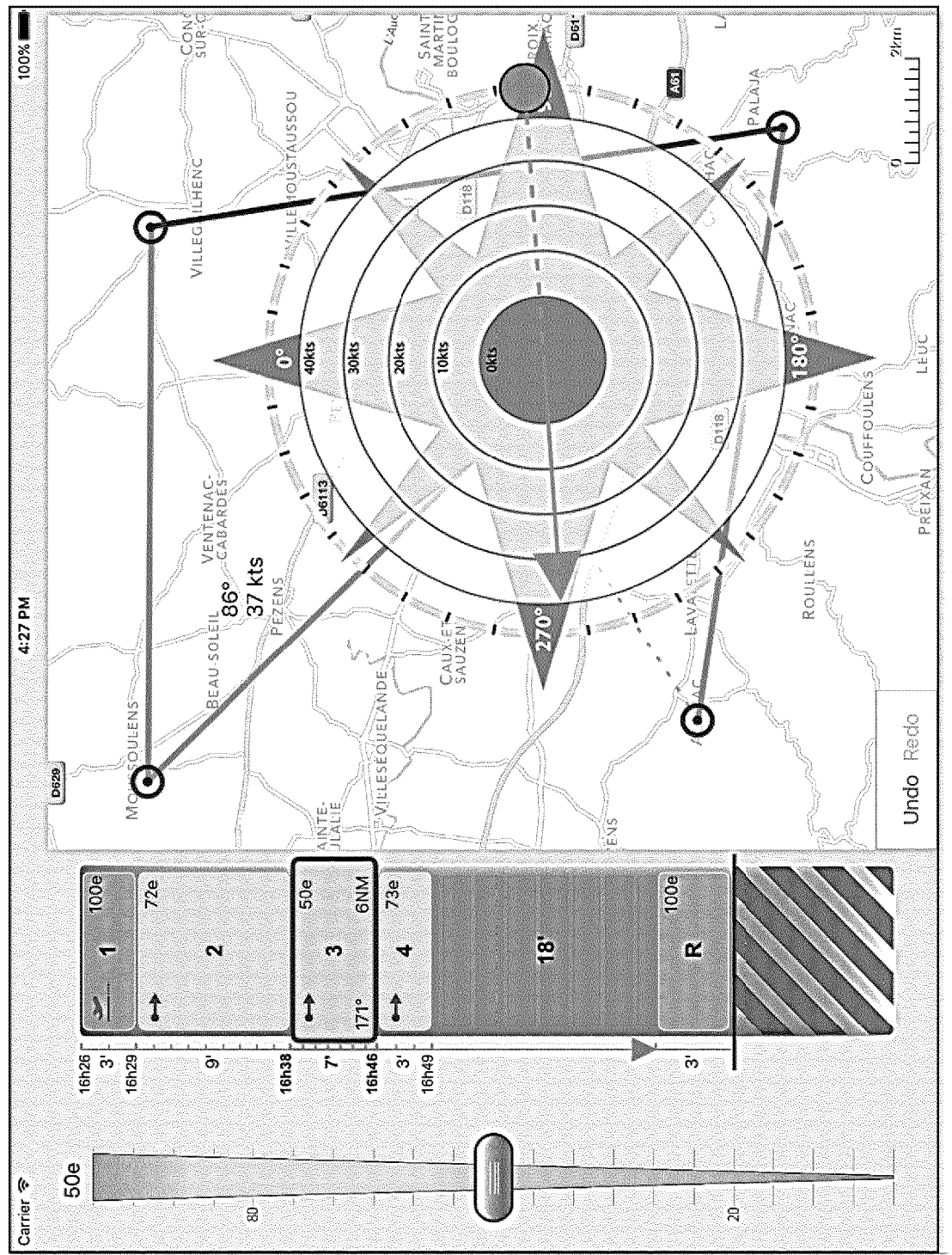

FIGS. 5a, 5b and 5c illustrate simulations of variation of a number of environmental or user defined parameters, in some embodiments of the invention.

These figures illustrate the enhanced simulation capability of a vehicle energy management simulation and control system according to the invention, enhanced meaning in the context of the invention, both the increased variety of variables which can be simulated and the graphical interaction which is offered to the user to perform the simulation.

The vehicle energy management computer computes energy consumption using environment data such as traffic density, weight (or number) of payload, or wind speed and direction.

At the preparation stage, instead of using real-time or predicted data (such as those provided by sensors 330, or entered by the user, the user is given the opportunity to input specific data in order to perform what-if simulations to optimize travels of the vehicle. To do so, the user can perform incremental changes on the data, which automatically and continuously trigger computation and refresh of the energy gauge.

Hence, the user can re-evaluate either the content of the mission or the day/time of the mission according to the change impact. In some configurations of the system of the invention, this can also be done during performance of the mission for the rest of the route to be travelled.

It is an object of the invention to provide these data fine-tuning operations from the map on the road to be travelled. The impact on the energy consumption is computed on the fly and visualized through continuous animated modification of the height/duration of the legs in the energy gauge. Thus, the user can see legs slightly enlarging or shrinking as a feed-forward of data modification.

For each data type, a direct manipulation device is available from the map, allowing the user to perform what-if simulation on the data:

For instance, as illustrated on FIG. 5a, to simulate a change in traffic density, the user can select an activity or a group of activities on the map, and tune the level of traffic density by adjusting a parameter of traffic density displayed on the screen, 510a (in this case on a scale from 0% to 100%. The energy consumption is updated by the route management system. The height and duration of the legs are consequently modified in the energy gauge. Henceforth, the user can evaluate the best conditions of traffic to execute a prepared mission in order to choose a day or time of departure. Alternatively, the user can change the prepared mission to adapt it according to the conditions of traffic that he/she has just input.

Button 521*a* is available on the display unit to select this simulation option.

Another button 522*a* may be available from the icon bar 520*a*. Once the option is selected, another horizontal slider similar to traffic density slider 510*a* will pop up to specify the total weight of passengers/freight. The weight may be specified in kilos or in units to be transported (i.e. number of passengers; number of containers).

FIGS. 5*b* and 5*c* illustrate a change in wind speed and direction: the user can tune speed and direction of the wind by direct manipulation of a vector on the map.

By way of example, the user presses circle 510*b* at the extremity of the wind vector 520*b* and drags it around so that it is moved to circle 510*c* and vector 520*c*, which is longer than vector 520*b*. In this example, this move represents a change in direction and speed from 220°, 20 knots to 86°, 37 knots. The energy consumption is updated in real-time by the route management system according to the new values of wind direction and speed. The height and duration indications of the activities are consequently modified on the energy gauge. See activities representations in the gauge of FIGS. 5*b* and 5*c*).

Henceforth, the user can evaluate the best conditions of wind to execute a prepared mission in order to choose a day or time of departure. Alternatively, the user can change the prepared mission to adapt it according to the conditions of wind that he/she has just input.

The three parameters (traffic density, weight, wind) can be modified in combination, for example:
  in the case of preparation of a delivery circuit (school bus, freight transport), in order to find which direction of the travel is to be used for an eco-routing strategy (weight and wind);
  in the case of traffic congestion, in order to chose the best itinerary; it can for instance be beneficial to increase the vehicle range to choose a more congested itinerary (shorter distance, lower speed and lower impact of wind because of surrounding traffic).

Wind is an important factor, not only for aircrafts but also for terrestrial vehicles. Actually, taking account of wind information in the system is important for ground-based vehicles such as cars and trucks in that counter wind, or "head winds" or wind resistance can greatly negatively impair speed and increase the required energy to complete a journey. See Jayakumar, F. Ingrosso, G. Rizzoni, J. Meyer and J. Doering, "Crowd sourced energy estimation in connected vehicles," *Electric Vehicle Conference (IEVC)*, 2014 *IEEE International*, Florence, 2014, pp. 1-8.

Furthermore, cars can travel on roads that are protected from wind (under a cliff, behind hills or in a dense forest), conversely to aircraft which cannot avoid wind. Thus, some parts of the journey may benefit from the protection from wind, depending on its direction. If the map contains information about terrain elevation and terrain nature, the system can leverage this knowledge to adapt the predicted energy consumption accordingly.

The elevation information can be especially useful for small UAVs that travel a low altitude, as they can benefit from the protection offered by cliffs and hills. One can then draw a path that follows the elevation (valleys, cliffs) and investigate its impact on energy consumption.

Furthermore, for closed circuits such as those where a truck picks up and/or delivers people or goods, changing the direction of the travel in case of wind might have an impact since the energy consumption depends on the direction of the wind, and the areas that are protected from it. The device enables the user to switch direction in order to see the difference of energy consumption between the two possible directions.

For taking advantage of this parameter, according to the invention, elevation and vegetation information from specific maps may be used in the system.

When the vehicle is a drone, it is possible to take advantage of changing wind directions thanks to wind breaks provided for by cliffs, trees or buildings on the route. By accessing this information on the map used to simulate and then control the mission, the route of the drone may be made to go through the most protected zones to minimize energy consumption.

Figure 6:
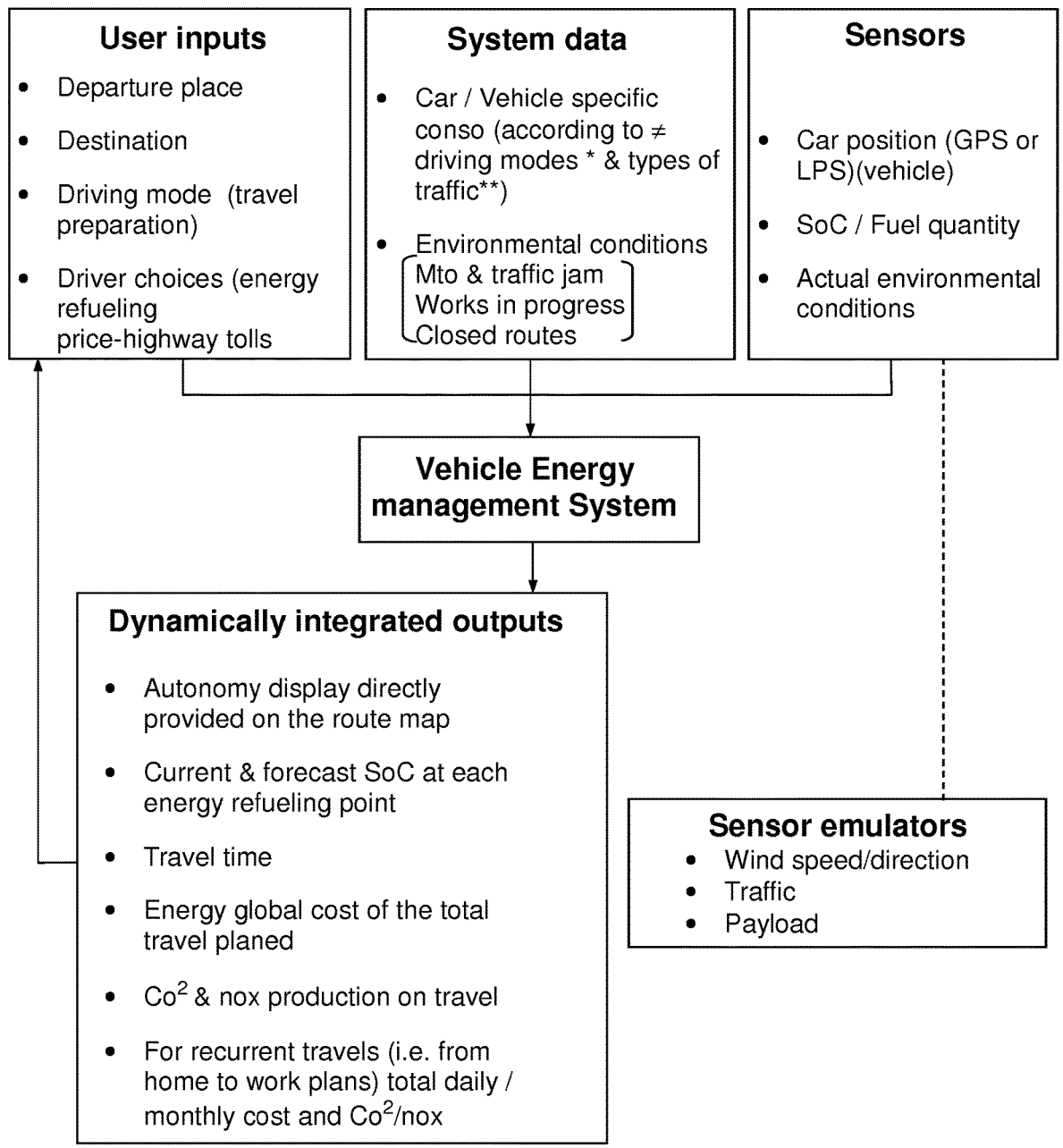
FIG. 6 represents a functional architecture of a vehicle energy management system in automotive vehicles.

FIG. 6 represents a functional architecture of a vehicle energy management system in a number of embodiments of the invention in automotive vehicles.

The architecture of the vehicle energy management system of the invention displayed on FIG. 6 is identical to the architecture displayed on FIG. 3, with some variants because of the specific usage of a terrestrial vehicle.

For instance, a driver of car will be given the opportunity to enter specific preferences, for instance using toll highways or not, or using specific refueling or recharging stations based on price information. Also, constraints in terms of time of arrival at destination or at definite waypoints may be needed. Driving modes will be defined for instance in relation to the maximum authorized speeds on an itinerary: normal mode will be a mode where the driver will drive at the speed limit; eco mode will be a mode where the driver will drive at a reduced speed (i.e. a percentage of maximum speed which is lower than 100%) to optimize consumption. In some variants, an emergency situation, automatically detected or triggered by the pilot/driver, may override the energy consumption modes, including the maximum speed limit.

Among the system data, some of which will be notably important, are the traffic conditions. They are normally provided by the navigation unit through which receives them from a service provider through a communication link. In lieu of real-time (or regularly updated) data, it is also possible to use parametric data, with for instance three type of traffic conditions, highway, road, urban, to which energy consumption parameters will be associated. Some of the data may be determined statistically, e.g. on mornings (from 7 to 9 am), there are queues of a certain length at some exits of highways.

The sensors will capture vehicle position, fuel quantity (or State of Charge, SoC, for an electrical vehicle) and actual environmental conditions, for instance wind, rain, road surface, and/or slope. Recharge stations may be marked as not available at a moment in time (closed, no more recharge capacity available, etc.).

The range attainable with the remaining fuel/SoC can be displayed directly on the route map. A current and a forecast SoC can be displayed vis-à-vis each recharging station on the route. The total energy cost of the travel/mission may also be displayed, as well as the production of greenhouse gases, total driving time or total travel time.

Each waypoint on the map can have a number of items of data displayed either permanently or when passing over the waypoint.

According to the invention, sensor emulators are also available to offer enhanced simulation capabilities, in addition to simulations of change of route, speed or time of arrival, so that the user gets the opportunity to simulate the impact of traffic conditions, payload and/or wind direction and/or speed on energy consumption and time of arrival.

chooses the Max Speed mode, but decides not to stop at RS1, 720, shortly after the departure.

The list of zones/sectors and legs, with the associated driving modes and the energy consumptions is displayed on the table below (with parts of the trip which cannot be travelled in bold characters).

| Sector | Type of Zone | Distance (km) | from | to | E-Mode/Speed | Autonomy (km) | E-Cons. | Cumulated Cons |
|---|---|---|---|---|---|---|---|---|
| S1 | Town | 3 | Departure | N124 | Normal/50 km/h | 80 | 0.0375 | 0.0375 |
| S2 | Highway (lmtd) | 20 | N124 | A61 | Normal/90 km/h | 130 | 0.1538 | 0.1913 |
| S3 | Highway | 57 | A61 + A66 | // PAMIERS | Normal/130 km/h | 80 | 0.7125 | 0.9038 |
| S4 | Highway (lmtd) | 17 | E9-N20 Pamiers | FOIX | Normal/110 km/h | 100 | 0.1700 | 1.0738 |
| S5 | Highway (lmtd) | 17 | FOIX | TARASCON/AR. | Normal/110 km/h | 100 | 0.1700 | 1.2438 |
| S6 | Road | 80 | TARASCON/AR. | LES ANGLES | Normal/90 km/h | 110 | 0.7273 | 1.9711 |
| S7 | Town | 20 | TARASCON/AR. | LES ANGLES | Normal/50 km/h | 80 | 0.2500 | 2.2211 |

FIGS. 7a to 7d represent a car navigation display with energy gauges in different configurations.

On these figures, the energy gauges are those of FIG. 1. But, according to the invention they may be easily substituted by the gauges of FIG. 2. Also the maps on the figures can be supplemented with the improvements displayed on FIGS. 4, 5a, 5b and 5c without difficulty.

Figure 7A:
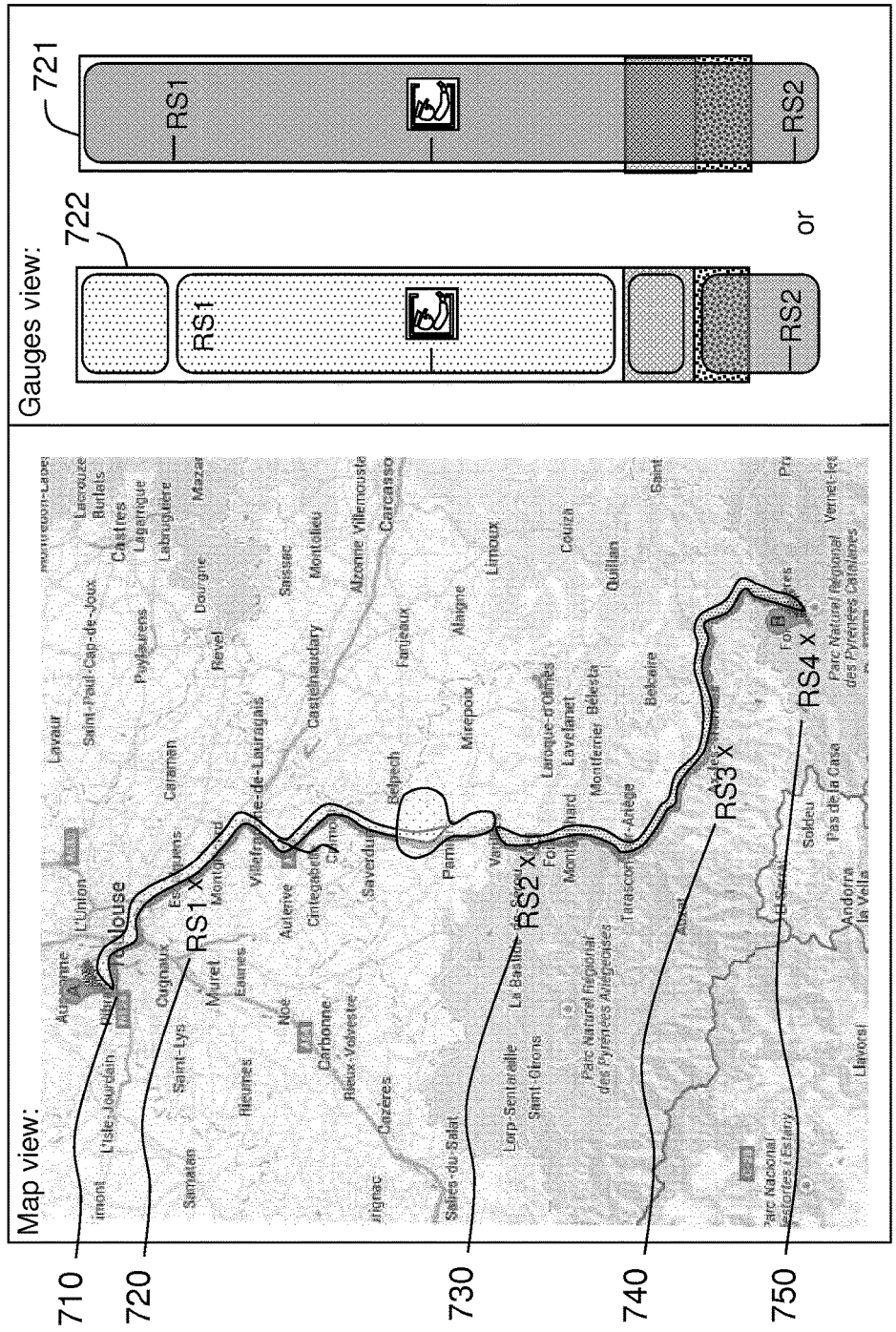

FIG. 7a illustrates a scenario where a user prepares a trip and intends to use a normal energy consumption mode, i.e. drive at the speed limit.

Before the trip, the driver plans his/her travel and makes some decisions about the way to manage the global trip.

After having entered in the system the departure and destination points in the car navigation system, the driver will be presented with a number of proposed itineraries, with a number of associated parameters: total distance, estimated travel time or time of arrival, quality of traffic, etc. . . . According to the invention, the system will integrate other data, such as Refueling/Recharging Stations (RS), highway tolls, accommodation, food and/or leisure activities possibly associated to the RS, driving and meteorological conditions (coming from external systems), and the driver's choices on the driving mode (i.e. Max Speed—at the speed limit, Medium or Eco), implying different energy consumption rates on the legs of the different zones or sectors of the travel (i.e. "Urban" zone, "Road" zone, "Highway" zone, etc. . .) and the RS stop-over choices. For vehicles equipped with different propulsion modes (e.g. gas/electric), the driver may select a mode for an activity/leg and another mode for another activity/leg. The mode may also be automatically selected. In some embodiments, the automatic mode selection may be based on preferences of the user.

In the example of FIG. 7a, the departure point is the city of Toulouse (France), 710, and the destination point the ski resort of Les Angles (France), 750, we assume that the driver In an embodiment, the system will display to the driver at the time of planning the trip a totally red gauge, 721, meaning that the solution is not acceptable, because the consumption is too high to reach RS2.

The driver could choose to stop at RS1, but it doesn't make sense, as it is time-consuming and useless. The driver will then try to find a less consuming solution, depicted on FIG. 7b, which is an example of re-planning what if simulation.

Because the quantity of energy that was missing to reach directly RS2 was small, the driver runs a what if scenario by modifying the driving mode, changing from "Max Speed" to "Eco" on one or a plurality of zones of the "Departure to RS2" leg.

Figure 7B:
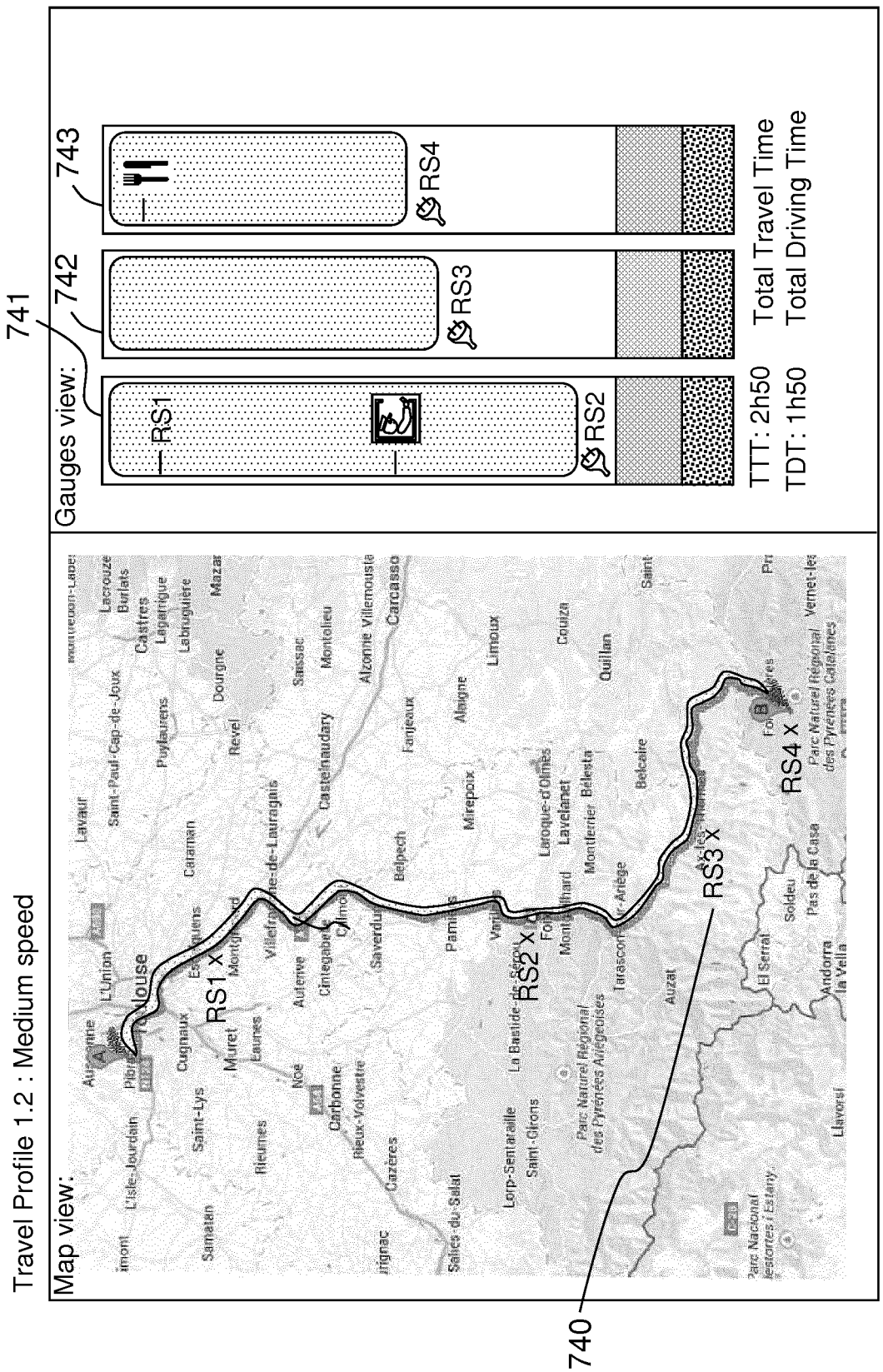

With reference to FIG. 7b, by changing the driving mode on the most expensive zone (S3=Highway at a normal speed) from "Max Speed" to "Eco" (see table below), the driver gets the possibility to reach directly RS2 with a sufficient margin, despite a possible short use of "reserve". Assuming a stop at RS3, 740 (for a recharging of around 40% consummated on that short leg), the system will show 3 parallel gauges, 741, 742, 743 for the 3 legs and calculate a Total Driving Time of 1H50 and a Total Travel Time of 2H50.

| Sector | Type of Zone | Distance (km) | from | to | E-Mode/Speed | Autonomy (km) | E-Cons. | Cumulated Cons |
|---|---|---|---|---|---|---|---|---|
| S1 | Town | 3 | Departure | N124 | Normal/50 km/h | 80 | 0.0375 | 0.0375 |
| S2 | Highway (lmtd) | 20 | N124 | A61 | Normal/90 km/h | 130 | 0.1538 | 0.1913 |
| S3 new | Highway | 57 | A61 + A66 | // PAMIERS | Economy/110 krr | 100 | 0.5700 | 0.7613 |
| S4 | Highway (lmtd) | 17 | E9-N20 Pamiers | FOIX | Normal/110 km/h | 100 | 0.1700 | 0.9313 |
| RS2 | Refueling/reloading at FOIX | | | | | | | |
| S5 | Highway (lmtd) | 17 | FOIX | TARASCON/AR | Normal/110 km/h | 100 | 0.1700 | 0.1700 |
| S6 | Road | 30 | TARASCON/AR. | AX-LES-TH. | Normal/90 km/h | 110 | 0.2727 | 0.4427 |
| RS2 | Refueling/reloading at AX-LES-THERMES | | | | | | | |
| S7 | Town | 20 | AX-LES-TH | and other villages | Normal/50 km/h | 80 | 0.2500 | 0.2500 |
| S8 | Road | 50 | AX-LES-TH. | LES ANGLES | Normal/90 km/h | 110 | 0.4545 | 0.7045 |

The values given above are illustrative examples only.

Concerning legs "RS2 to RS3" and "RS3 to RS4", the driver sees the same small quantity of energy missing to reach directly RS4, in only one leg, which could be done, subject to some adaptation of the driving mode. This example of an optimization what if simulation is depicted on FIG. 7c.

The expected result will be obtained by reducing the consumption successively on all the remaining sectors, as shown of the table below.

| Sector | Type of Zone | Distance (km) | from | to | E-Mode/Speed | Autonomy (km) | E-Cons. | Cumulated Cons |
|---|---|---|---|---|---|---|---|---|
| S1 | Town | 3 | Departure | N124 | Normal/50 km/h | 80 | 0.0375 | 0.0375 |
| S2 | Highway (lmtd) | 20 | N124 | A61 | Normal/90 km/h | 130 | 0.1538 | 0.1913 |
| S3 new | Highway | 57 | A61 + A66 | // PAMIERS | Economy/110 km/h | 100 | 0.5700 | 0.7613 |
| S4 new | Highway (lmtd) | 17 | E9-N20 Pamiers | FOIX | Eco-forte/90 km/h | 130 | 0.1308 | 0.8921 |
| RS2 | | | Refueling/reloading at FOIX | | | reduced time for Reloading | | |
| S5 new | Highway (lmtd) | 17 | FOIX | TARASCON | Eco-forte/90 km/h | 130 | 0.1308 | 0.1308 |
| S6 new | Road | 30 | TARASCON/AR. | AX-LES-TH. | Economy/80 km/h | 130 | 0.2308 | 0.3615 |
| RS3 | | | Refueling/reloading not necessary at AX-LES-THERMES | | | | | |
| S7 new | Town | 20 | AX-LES-TH and other villages | | Economy/40 km/h | 100 | 0.2000 | 0.5615 |
| S8 new | Road | 50 | AX-LES-TH. | LES ANGLES | Economy/80 km/h | 130 | 0.3846 | 0.9462 |

Note that for sector 5 (highway limited to 110 km/h) the driving mode is downgraded from Medium to Eco mode, and that for sector 6 and 8 (road) and 7 (urban), it is downgraded from Max Speed to Eco mode.

With reference to FIG. 7c, the system finally shows only two parallel gauges 751, 752 for 2 legs and different values for Total Driving Time (2H00 instead of 1H50) and Total Travel Time (2H30 instead of 2H50).

We may assume that the driver, with the help of the system, has the choice to make a number of different informed decisions, and the final choice will be made according to the priorities of the user on this travel:
- If the driver is in a hurry to reach the destination or prefers to ensure a low level of consumption (price and low gas emission), the last solution (the one of FIG. 7c) is the best.
- If he/she is in a holiday/touristic travel and wishes to reduce the Driving Time to get more time to visit or go to the restaurant during the recharging stop at RS3 around midday, it will be better to come back to the solution provided with 3 legs in FIG. 7b.

These examples illustrate some of the purposes of the system of the invention, i.e. to help drivers to make the best decision on the spot by calculating quickly the consequences of different options. Of course, in the example above, we didn't take into account all external data, which could lead to different situations (actual consumption, better or worse, road and meteorological conditions, diverting itineraries or unforeseen events that would be instantaneously integrated by the system to update the information provided to the driver.

FIG. 7d represents the gauges 761, 762 displayed during the travel, with the upper part of the gauge showing in dark, all along the leg, the consumed quantities, 763.

All these planning/simulation exercises can be combined with interactive graphical simulations of an impact of a change in energy consumption mode, speed and/or time of departure or arrival, as displayed on FIG. 4. They can also be combined with graphical simulations of an impact of a change in traffic conditions, weight of payload and/or wind direction and/or speed. Thanks to these improvements according to the invention the planning and optimization capability of an automotive vehicle energy management system may be greatly improved.

Figure 8:
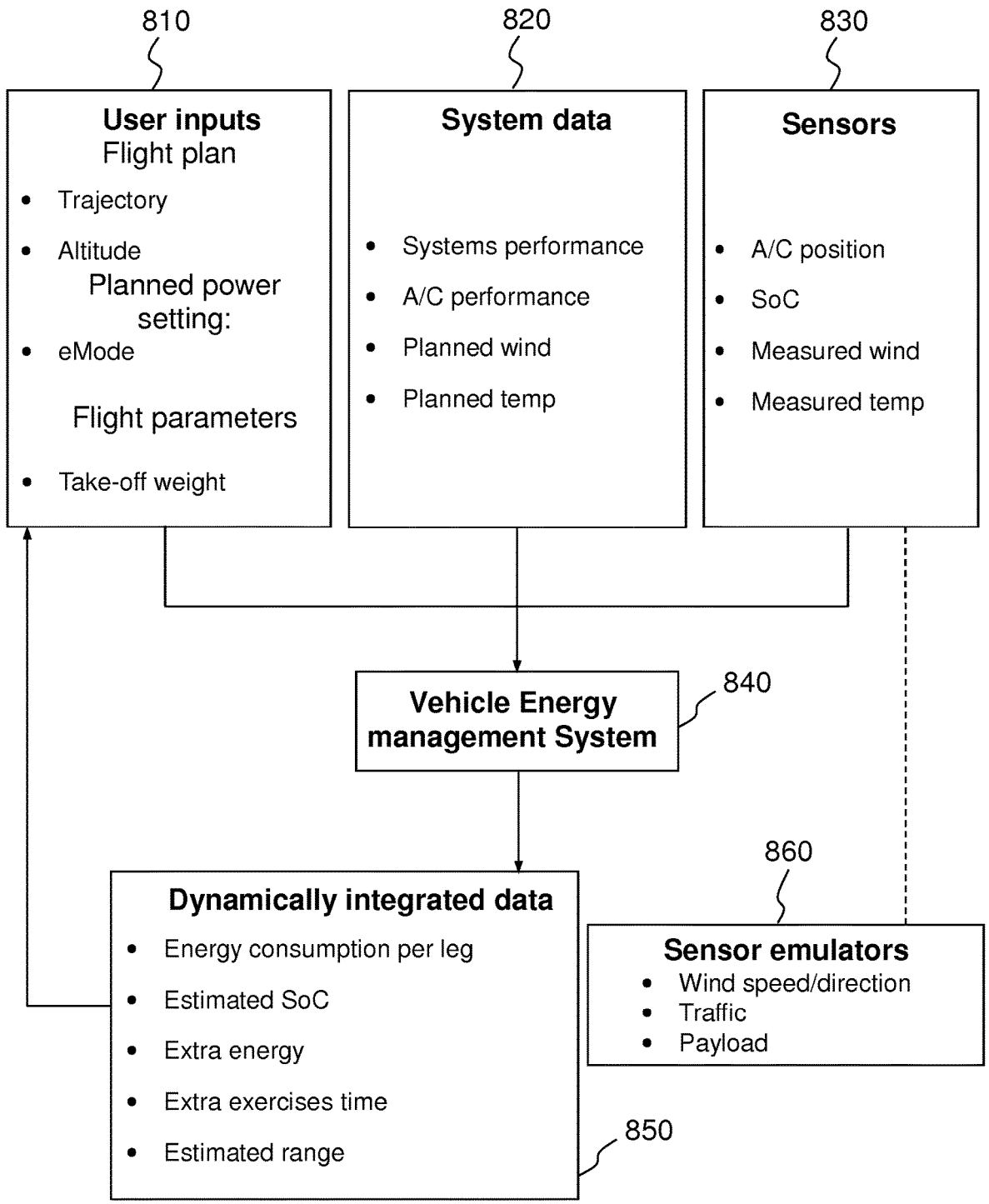
FIG. 8 represents a functional architecture of a vehicle energy management system in aerospace vehicles.

FIG. 8 represents a functional architecture of a vehicle energy management system in a number of embodiments of the invention in aerospace vehicles.

Among the user inputs, elements of the route planning, 310, which characterize a flight are a combination of way-points on the ground and altitudes which are entered in the flight plan that may contain altitude information. A flight plan is generally prepared before the mission, possibly but not necessarily on a specific computer not located on-board. The flight plan is then transferred to the flight management computer. The take-off weight is an important input. It can also be a system data calculated from the SoC of the tanks, the number of passengers and the cargo. The planned power settings for each leg (or by default for the whole plan) may also be entered, possibly, by the user.

Among the System data, 320, the systems performance and the A/C performance comprise level flight speed as a function of power, weight, altitude and other parameters, climb rate as a function of power, weight, altitude and other parameters, glide ratio as a function of weight, altitude and other parameters etc. The planned wind and temperature are also important parameters, because they will significantly impact, notably the first parameter, the energy consumption.

The sensors, 330, will provide the A/C position, the SoC and the measured wind and temperature. In case of strong headwind, the system will take into account that the ground speed will be reduced, thus increasing consumption for the leg.

According to the invention, sensor emulators 360 are also available to offer full simulation capabilities, in addition to simulations of change of route, speed or time of arrival, so that the user gets the opportunity to simulate the impact of traffic conditions, payload and/or wind direction and/or speed on energy consumption and time of arrival. In the case of an aircraft, the traffic conditions will for instance be the traffic density at the airport of departure or arrival.

The Dynamically Integrated Outputs 350 will include, among possible other variables, the Energy consumption per leg, the Estimated SoC, the Estimated Range, the Extra energy and its corresponding Estimated Range. When the aircraft has a specific mission, for example exercises, for a training aircraft, an estimated exercises time, or the number of holding patterns it is possible to fly in case of immediate return. Also, time of departure from a waypoint and time of arrival at a waypoint will be among the dynamically integrated output to be displayed on the energy gauge together with a representation of the time of the type displayed on FIG. 2.

Figure 9:
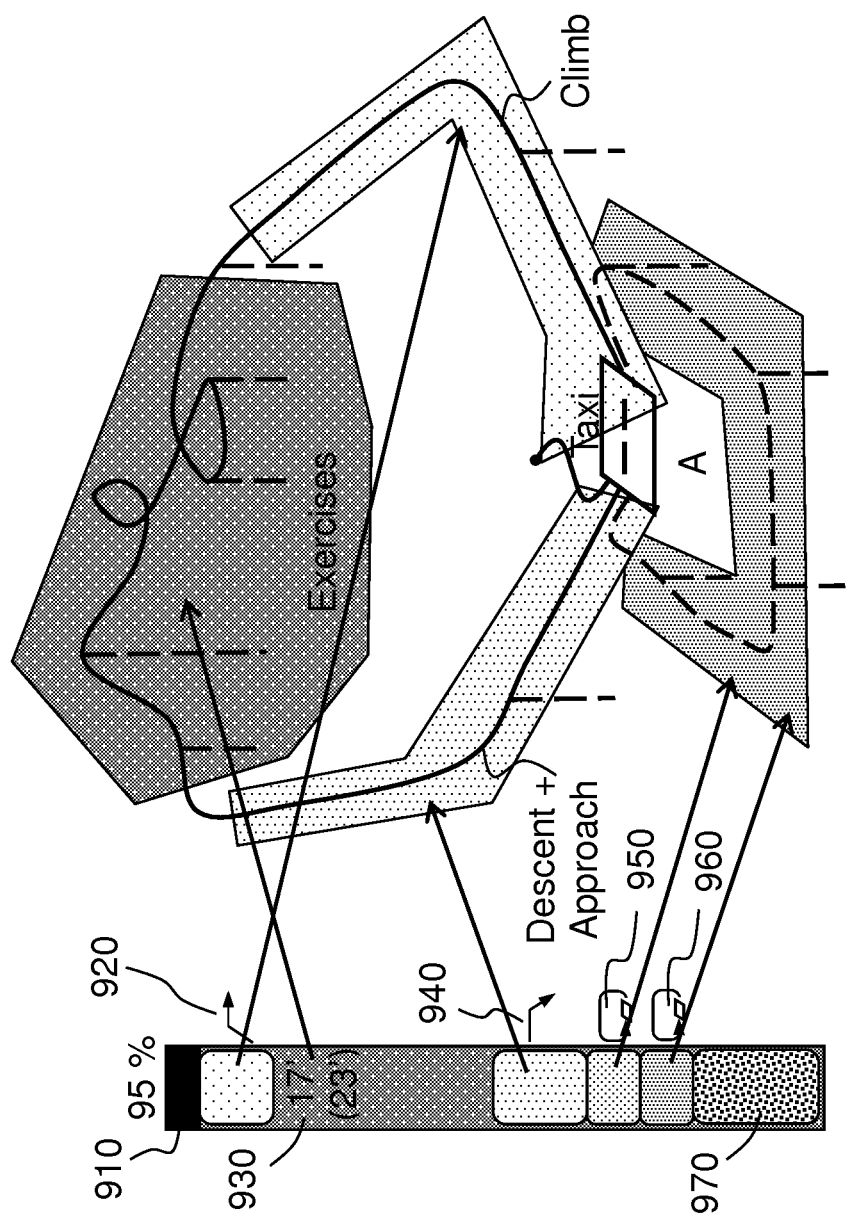
FIG. 9 represents the gauge of FIG. 1 with a match to the activities of a typical training flight.

FIG. 9 represents the gauge of FIG. 1 with a match to the activities of an aircraft.

The gauge of FIG. 1 can be easily substituted by the gauge of FIG. 2, according to the invention. Also maps can be presented to the pilot in the aircraft or at the time of preparing the flight with the improvements displayed on FIGS. 4, 5a, 5b and 5c without difficulty.

The gauge comprises symbols representative of activity/flight phases matching defined below:

Climb, 920;
Exercises, 930;
Descent and approach, 940;
Two possible patterns 950 and 960.

The consumption to date and the Current SoC, 910, and the reserve 970 are also potentially displayed.

Also, time of departure from a waypoint and time of arrival at a waypoint will be among the dynamically integrated output to be displayed on the energy gauge together with a representation of the time of the type displayed on FIG. 2.

According to the invention, the system offers full simulation capabilities, in addition to simulations of change of route, speed or time of arrival, so that the user gets the opportunity to simulate the impact of traffic conditions, payload and/or wind direction and/or speed on energy consumption and time of arrival. In the case of an aircraft, the traffic conditions will for instance be the traffic density at the airport of departure and/or arrival.

The inventors have applied their invention to other fields which are now commented upon. One of these field is project planning. The other one is energy management on an electronic device. Both applications are commented upon below.

Figure 10A:
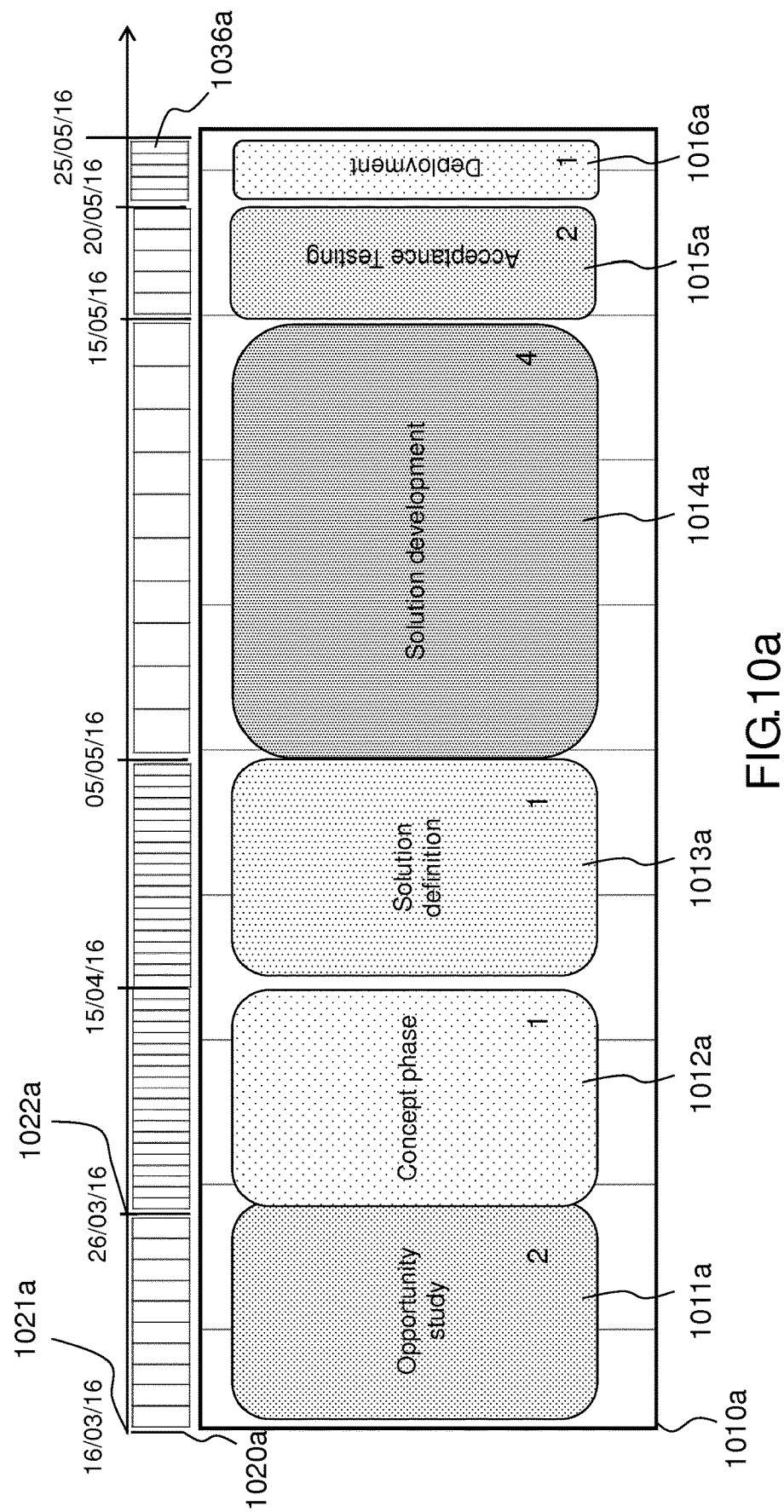
FIGS. 10*a*, 10*b* and 10*c* represent different views of a resource management system according to the invention.
Figure 10B:
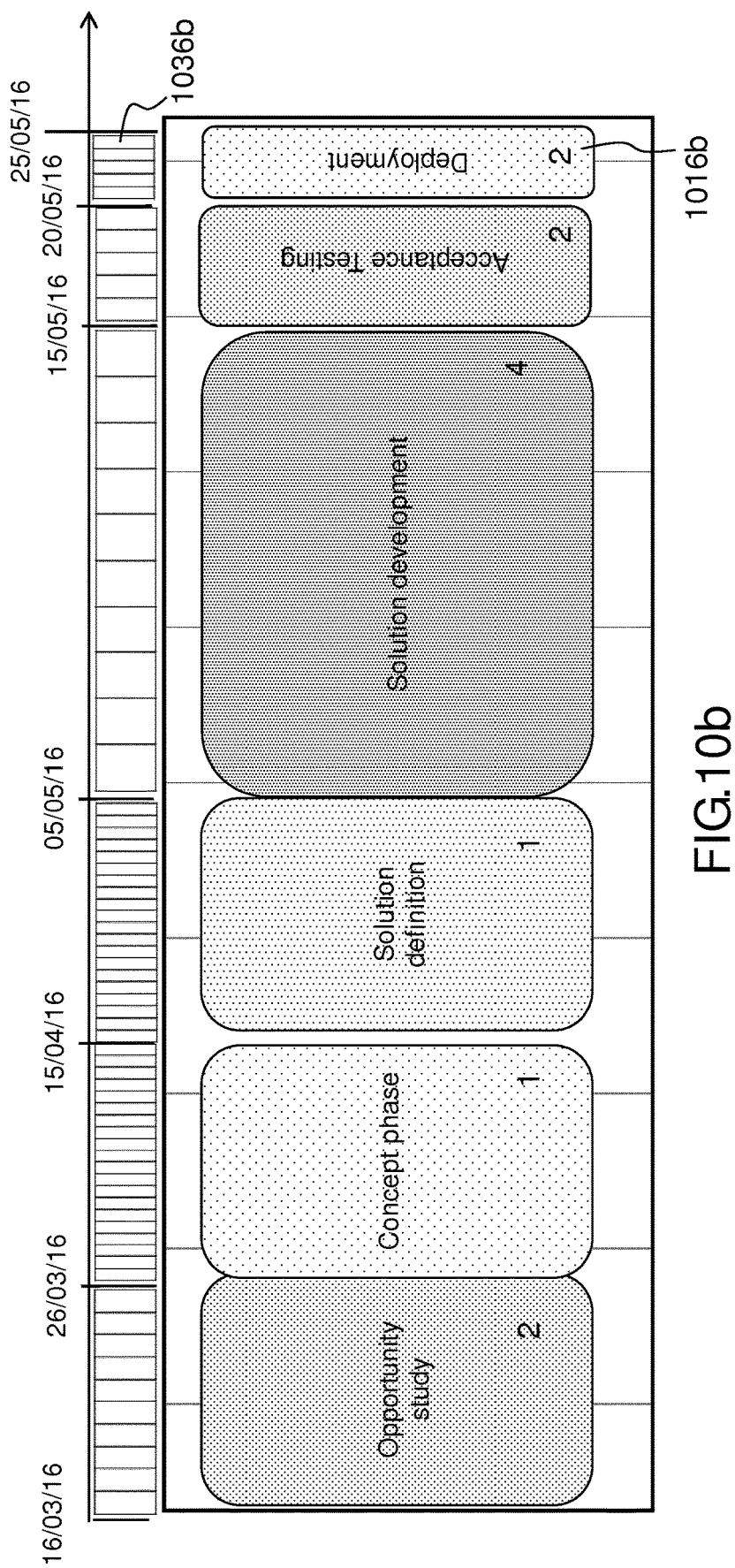
Figure 10C:
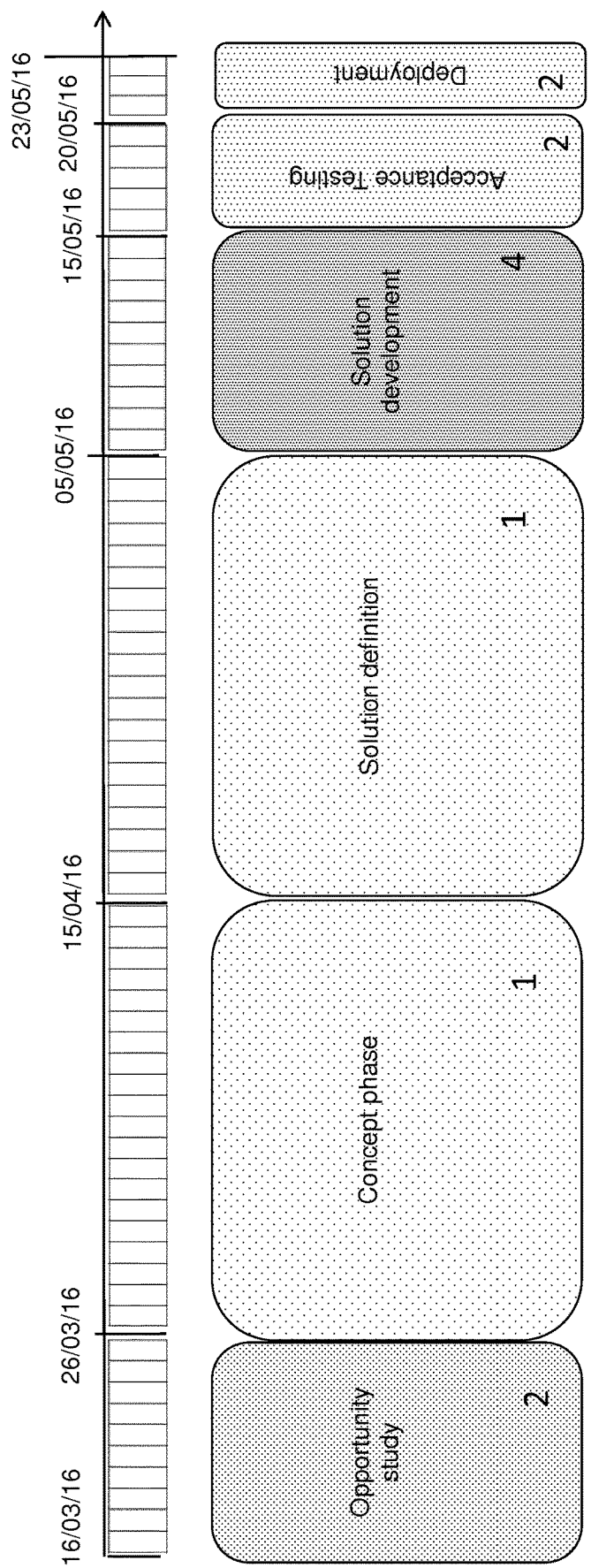

FIGS. 10a, 10b and 10c represent different views of a resource management system according to the invention.

Project management involves resource management and time management. According to standard operating procedures which are commonly applied to project management, notably when a project management software of the Microsoft Project™ or MS Project™ type is used, a project is broken down in work packages (WP), each project is represented by a bar chart on a timeline with a start and an end date, using a Gantt representation. Resources may be allocated to each WP. The inventors do not know of any Gantt representation which would present the resources consumed by a WP (or planned to be consumed by a WP) in a way which would easily display what are:
- the relative part of the resource x time (i.e. energy) budget/consumption;
- the number of staff allocated to a WP;
- the time spent on each WP with a scale which is commensurate with the energy budget of each WP, while the time scale for each WP is proportional to the time spent on said WP.

This is precisely what is achieved by applying to project management the same principles as those applied to an energy gauge according to the other aspects of the invention described above in the description.

According to a first aspect of the invention as applied to generic resource management, an embodiment of which is represented on FIG. 10a, WPs, Opportunity Study (WP1), Concept Phase (WP2), Solution Definition (WP3), Solution Development (WP4), Acceptance & Testing (WP5), Deployment (WP6), are represented by horizontal bars 1011a, 1012a, 1013a, 1014a, 1015a, 1016a. Time is represented on time bar 1020a, with a start time 1021a and an end time 1022a for WP1. The width of each individual bar is proportional to the product of the duration of the WP times the resources allocated to the WP. On the example of FIG. 10a, 2 employees are allocated to each of WP1 and WP5, 1 employee is allocated to each of WP2, WP3 and WP6.

According to a second aspect of the invention, there are as many ticks represented for each WP on the time scale that time units between the start time and the end time of the WP. For example, there are 5 ticks 1036a for WP6, one for each day, which corresponds to a WP of 5 days staffed with a single employee. In the representation of the figure, all calendar days are deemed to be working days, which is a simplification, but of course, calculating in working days instead of calendar days can be easily achieved with MS Project or a like software.

According to a third aspect of the invention, which is depicted on FIG. 10b, the user can simulate the impact on total energy budget consumed. WP6 benefits from the allocation of a $2^{nd}$ employee and, thus, the resource budget allocated to this WP increases to 10 men*days, which is reflected on the figure, on bar 1016b. Likewise, the ticks 1036b on the time bar are only 2,5, to reflect the shortened time needed. Addition (or suppression) of a resource may be performed at any time of the project.

According to a fourth aspect of the invention, which is depicted on FIG. 10c, the user can display the WPs using a time scale. The representation is close to a Gantt classic representation, but the user can easily visualize the differences in staffing of the WPs thanks to their different colors/tones. Also, the amount of resources is displayed on each WP bar. It is possible to switch between the two representations easily, for instance using a button (not represented).

Variants of the representation are possible: for instance the resource bars and time bar may be vertical instead of horizontal. Also, the time and resources representation may be inverted, like in the case of energy management for a vehicle, as described above.

Other resources needed to implement the project may also be represented on a second resource bar or a third resource bar (not represented on the figures). Such resources may be computer resources, network resources or others.

Incidents in the management of the project can also be represented and/or simulated (not represented on the figures). For instance, if one or more resources are not available, the resource budget and the time needed to complete a WP and the project will be recomputed and represented on the bars.

Figure 11:
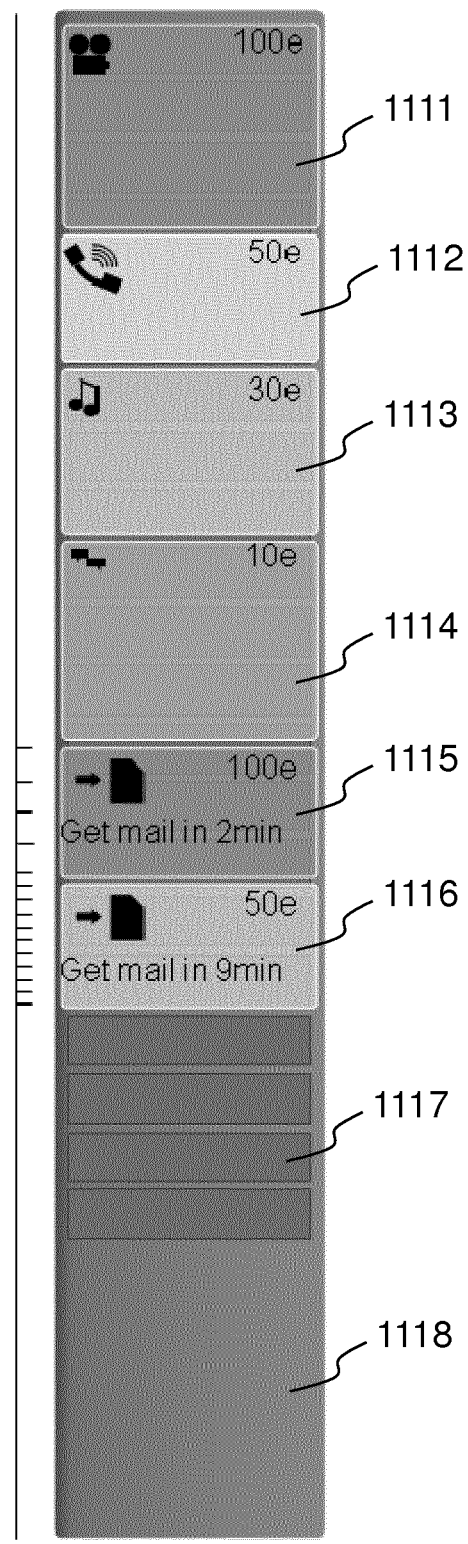
FIG. 11 represents an energy management system for a mobile portable device according to the invention.

FIG. 11 represents an energy management system for a mobile portable device according to the invention.

A portable mobile communication device, such as a smart phone, a tablet or a laptop, may now be used for a number of different activities, like watching a video in streaming mode or from the disk of the device, to listen to music in the same modes, to browse the Internet, to communicate with other users, via voice, SMS or e-mails, to locate the user via a GNSS receiver and/or motion sensors, etc The communication may be established with servers or other devices either via a land local area or wide area network, via a Wi-Fi, a Bluetooth or a cellular network connection.

Some use cases are more demanding in terms of battery drain. Energy consumption modes may be automatically adapted. By way on non limiting example, the Radio Resource Control (RRC) protocol defines, for instance for W-CDMA communication channels, a CELL-DCH state (Dedicated Channel state), a CELL-FACH state (Forward Access Channel state), a CELL-PCH state (Paging Channel state) and an URA-PCH state (URA Paging Channel state), in addition to a Sleep state. The battery drain of CELL-FACH state is 50% of the CELL-DCH state.

According to the invention, use cases may be defined to map a definite activity to one of the RRC states, FIG. 11 represents an example of an energy consumption bar of the type of FIG. 2, where the activities performed with a vehicle have been replaced by activities performed with a portable mobile communication device, for example:
Activity 1111 is a video watching activity;
Activity 1112 is a voice communication activity;
Activity 1113 is a music listening activity;

Activity 1114 is a SMS/instant messaging send/receive activity;

Activities 1115 and 1116 are two e-mails receive activities, with different battery drains, for instance depending on the size of attachments or a constraint set by the user to retrieve the e-mail within a definite time.

A person of ordinary skill in the art will recognize that other activities that impact battery consumption of a portable electronic device may also fall within the scope of the present invention. Each activity bar is represented in a color or tone corresponding to the network usage state/battery drain: activity 1111 is performed using a maximum battery drain state (CELL-DCH). It can be also set to a lower value, using for instance a slider (not represented on the figure), if the user accepts a degradation of the resolution of the video, the other activities. Likewise for the e-mail retrieval activity 1115. The other activities are performed using a lower battery drain factor (50% for activities 1112 and 1116, 30% for activity 1113, 10% for activity 1114. Also, these values may be defined by the user, using the same slider, when the user selects a definite activity, when he/she has predefined the activities to be performed in a time horizon.

The remaining battery is represented by bar 1117 and a reserve by bar 1118.

According to an aspect of the invention, simulations of the impact of variations of the energy consumption mode may also be performed, as in the case of the energy management system of a vehicle.

According to a further aspect of the invention, a time bar 1120 with start and end times of each activity and ticks 1121 representing the number of time units corresponding to an activity may also be included alongside the activity bar.

According to still a further aspect of the invention, an impact of a change in the quality of service (video or audio for instance) may be simulated.

According to still a further aspect of the invention, an impact of network density—which decreases power to acquire a base station but increases roaming—may be simulated.

Thanks to the invention, a user will have the capacity to adapt the activities performed with the device to the battery state at a moment in time.

It is apparent for a man skilled in the field of resource management that the invention may be also applied to other devices/application contexts which are not depicted in the figures that have been described above but for which it may be useful to manage activities to optimize a result under resource constraints.

The examples disclosed in this specification are only illustrative of some embodiments of the invention. They do not in any manner limit the scope of said invention which is defined by the appended claims.

The invention claimed is:

1. A vehicle route management simulation and control system comprising:
   an input interface configured to allow input of a route with a plurality of waypoints, said waypoints defining segments, each segment associated with an activity and an energy consumption mode;
   a plurality of one or more of sensors or sensor emulators configured to provide one or more of a position or an estimate of a position of the vehicle relative to the route, one or more of an amount of remaining energy or an estimate of an amount of remaining energy and measurements or estimates of variables impacting energy consumption;
   a calculation unit configured to:
      associate a predicted energy consumption to each segment of the route, based on vehicle features, segment features and the energy consumption mode associated by the user with the segment;
      compute a predicted total energy consumption for the route;
      adjust the predicted energy consumption associated to each segment of the route and the total energy consumption for the route based on outputs from the plurality of the one or more of the sensors or the sensor emulators;
   a display unit configured to present outputs of the calculation unit and outputs of some of the plurality of the one or more of the sensors or more of the sensor emulators;
   wherein the display unit is further configured to graphically present the predicted total energy consumption for the route by activity.

2. The vehicle route management simulation and control system of claim 1, wherein the calculation unit is further configured to simulate an impact of a modification of the inputs on the predicted total energy consumption for the route by activity.

3. The vehicle route management system of claim 1, wherein the display unit is further configured to display one or more of a start time, an end time of an activity, or a duration of an activity.

4. The vehicle route management simulation and control system of claim 1, wherein the input interface is configured to receive inputs from one or more of a user or one or more of the sensor emulators, said inputs being representative of estimates of the variables impacting energy consumption.

5. The vehicle route management simulation and control system of claim 4, wherein the estimates of the parameters impacting energy consumption comprise one or more of a speed or a direction of wind, a variation in altitude of the vehicle, a density of traffic or a weight or a volume of a payload of the vehicle.

6. The vehicle route management simulation and control system of claim 1, comprising a simulation subsystem and a control subsystem which are configured to transfer data to one another, in one or more of a real time mode and a time-differed mode.

7. The vehicle route management simulation and control system of claim 6, wherein the calculation unit is further configured to simulate an allocation of a cost budget to a selection of activities, wherein said cost budget is a weighted combination of energy, time, range and payload.

8. The vehicle route management simulation and control system of claim 1, wherein the vehicle is an automotive vehicle, the predicted energy consumption of a segment depends on at least one of a vertical profile of the segment, current traffic conditions on the segment, predicted traffic conditions on the segment, a driving style of a user.

9. A method for managing a route of a vehicle, said method comprising:
   receiving input, via an input interface, a route with a plurality of waypoints, said waypoints defining segments, each segment associated with an activity and an energy consumption mode;
   capturing from a plurality of one or more of sensors and sensor emulators one or more of a position or an estimate of a position of the vehicle relative to the route, an estimate of an amount or an amount of remaining energy and measurements or estimates of parameters impacting energy consumption;

causing a calculation unit to:
- associate a predicted energy consumption to each segment of the route, based on vehicle features, segment features and the energy consumption mode associated by the user with the segment;
- compute a predicted total energy consumption for the route;
- adjust the predicted energy consumption associated to each segment of the route and the total energy consumption for the route based on outputs from the plurality of the one or more sensors or sensor emulators;

presenting on a display unit outputs of the calculation unit and outputs of some of the plurality of the one or more sensors or sensor emulators;

wherein the presenting comprises graphically presenting the predicted total energy consumption for the route by activity.

10. A computer program product for managing a route of a vehicle stored on a non-transitory computer storage medium comprising computer instructions to be executed by one or more processors, said computer instructions comprising:
- input interface components configured to allow a input of a route with a plurality of waypoints, said waypoints defining segments, each segment associated with an activity and an energy consumption mode;
- sensor or sensor emulator processing instructions configured for capturing from a plurality of one or more of sensors or sensor emulators one or more of a position or an estimate of a position of the vehicle relative to the route, an amount or an estimate of an amount of remaining energy and measurements or estimates of variables impacting energy consumption;
- data processing instructions configured to:
  - associate a predicted energy consumption to each segment of the route, based on vehicle features, segment features and the energy consumption mode associated by the user with the segment;
  - compute a predicted total energy consumption for the route;
  - adjust the predicted energy consumption associated to each segment of the route and the total energy consumption for the route based on outputs from the plurality of the one or more of the sensors or the sensor emulators;
- presentation components configured to present on a display unit outputs of the data processing instructions and outputs of at least one of the plurality of the one or more sensors or sensor emulators;
- wherein the presentation components are further configured to graphically present the predicted total energy consumption for the route by activity.

11. A vehicle route management unit comprising:
- an interface to an input interface configured to allow input of a route with a plurality of waypoints, said waypoints defining segments, each segment associated with an activity and an energy consumption mode;
- an interface to a plurality of one or more of sensors or sensor emulators configured to provide one of a position or an estimate of a position of the vehicle relative to the route, an amount or an estimate of an amount of remaining energy and measurements or estimates of variables impacting energy consumption;
- a calculation unit configured to:
  - associate a predicted energy consumption to each segment of the route, based on vehicle features, segment features and the energy consumption mode associated by the user with the segment;
  - compute a predicted total energy consumption for the route;
  - adjust the predicted energy consumption associated to each segment of the route and the total energy consumption for the route based on outputs from the plurality of the one or more sensors or sensor emulators;
- an interface to a display unit configured to present outputs of the calculation unit, outputs of some of the plurality of the one of more sensors or sensor emulators and graphical views of the predicted total energy consumption for the route by activity.

* * * * *